United States Patent
Vanderwiel

(10) Patent No.: US 7,401,013 B2
(45) Date of Patent: Jul. 15, 2008

(54) METHOD TO OPTIMIZE TEST DATA

(75) Inventor: Robert W. Vanderwiel, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1255 days.

(21) Appl. No.: 09/978,817

(22) Filed: Oct. 15, 2001

(65) Prior Publication Data

US 2003/0074169 A1 Apr. 17, 2003

(51) Int. Cl.
*G06G 7/48* (2006.01)
*G01C 22/00* (2006.01)

(52) U.S. Cl. .................. 703/8; 703/2; 703/6; 703/7; 700/28; 700/33; 701/1; 701/16; 701/23; 701/25

(58) Field of Classification Search ............... 703/6, 703/8; 701/211, 1–16, 23, 25; 700/28–33
See application file for complete search history.

(56) References Cited

U.S. PATENT DOCUMENTS

| | | | | |
|---|---|---|---|---|
| 4,442,491 A | * | 4/1984 | Olhausen, Jr. .............. | 701/221 |
| 4,646,241 A | * | 2/1987 | Ratchford et al. ............ | 701/14 |
| 5,270,642 A | | 12/1993 | Parker ........................ | 324/158 |
| 5,742,513 A | | 4/1998 | Bouhenguel et al. ........ | 364/492 |
| 5,908,176 A | * | 6/1999 | Gilyard ...................... | 244/203 |
| 6,016,465 A | * | 1/2000 | Kelly ......................... | 702/116 |
| 6,216,063 B1 | * | 4/2001 | Lind et al. ................... | 701/3 |
| 6,292,720 B1 | * | 9/2001 | Schulz et al. ................ | 701/3 |
| 6,389,333 B1 | * | 5/2002 | Hansman et al. ............. | 701/3 |
| 6,446,015 B1 | * | 9/2002 | Duke .......................... | 702/66 |
| 6,529,821 B2 | * | 3/2003 | Tomasi et al. ............... | 701/202 |
| 6,609,036 B1 | * | 8/2003 | Bickford ..................... | 700/30 |
| 2002/0183922 A1 | * | 12/2002 | Tomasi et al. ............... | 701/202 |

FOREIGN PATENT DOCUMENTS

EP 0892 248 A2 7/1998

OTHER PUBLICATIONS

"Strategic and Tactical Decission—making under Uncertainty", M. Jordan et al, Research Progress Report, University of California, Feb. 15, 2001.*

* cited by examiner

*Primary Examiner*—Fred Ferris
(74) *Attorney, Agent, or Firm*—Bracewell & Giuliani LLP

(57) ABSTRACT

A method for optimizing data gathering, is provided wherein the method comprising the steps of designing a first system test comprising two or more maneuvers, compiling a one or more data variable for each of the two or more maneuvers from the first system test, pooling each data variable from each maneuvers into a first set of data, removing a first maneuver's data variables from the pooled first set of data, comparing the first maneuver's data variables against the first set of data with the first maneuver's data variables removed, and determining whether to perform the first maneuver based on whether the maneuver provided new data.

16 Claims, 21 Drawing Sheets

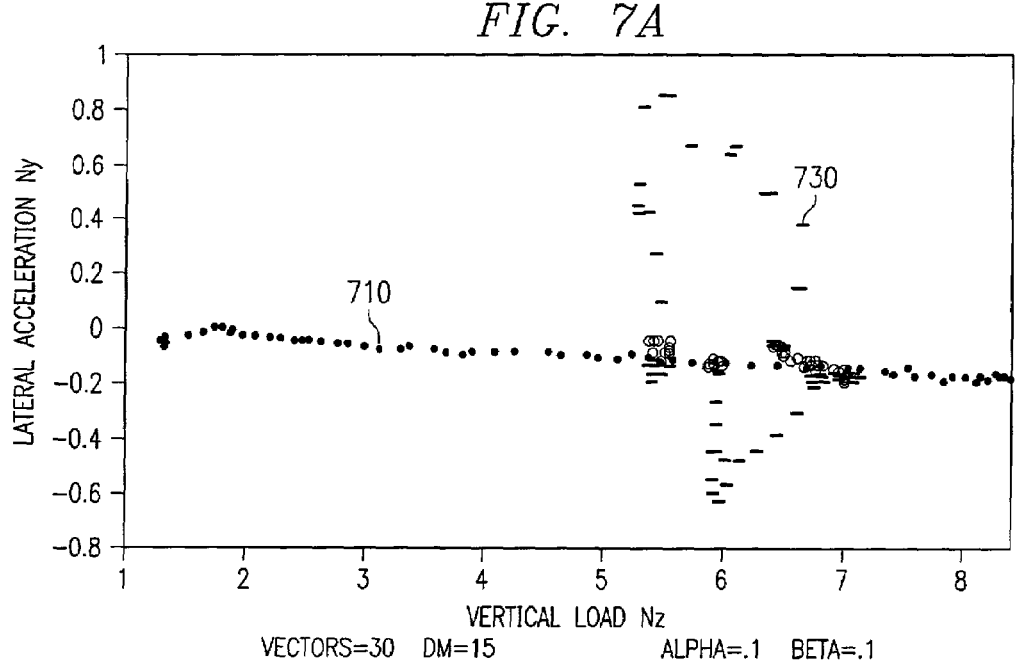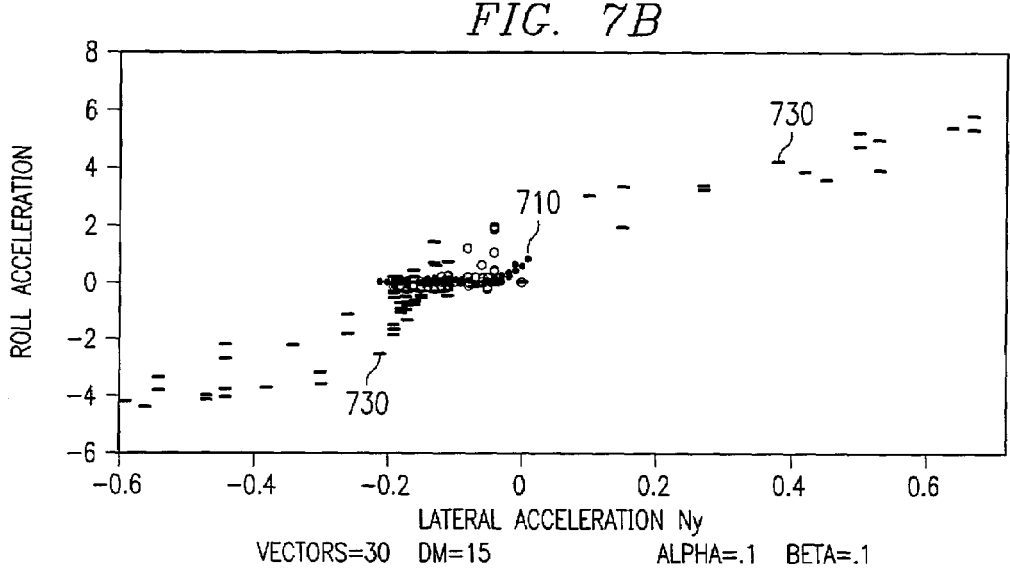

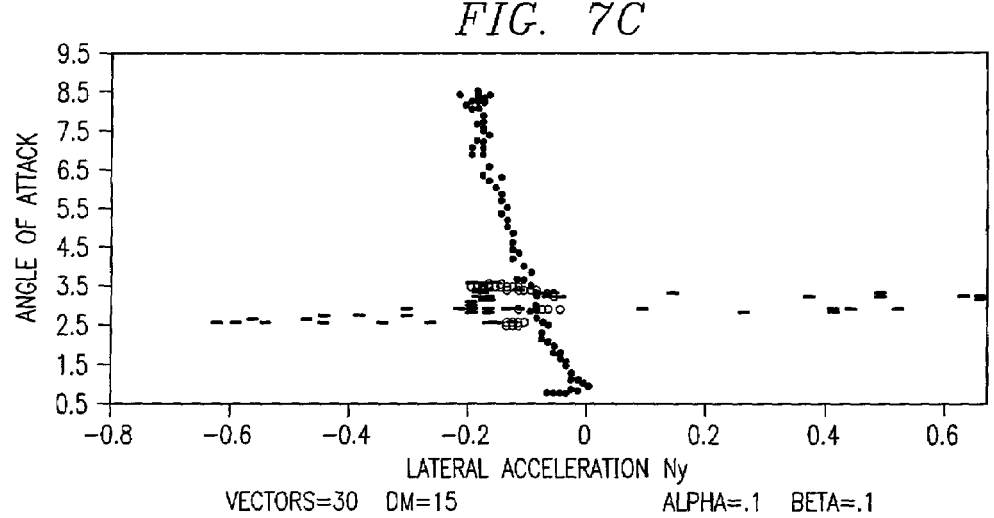
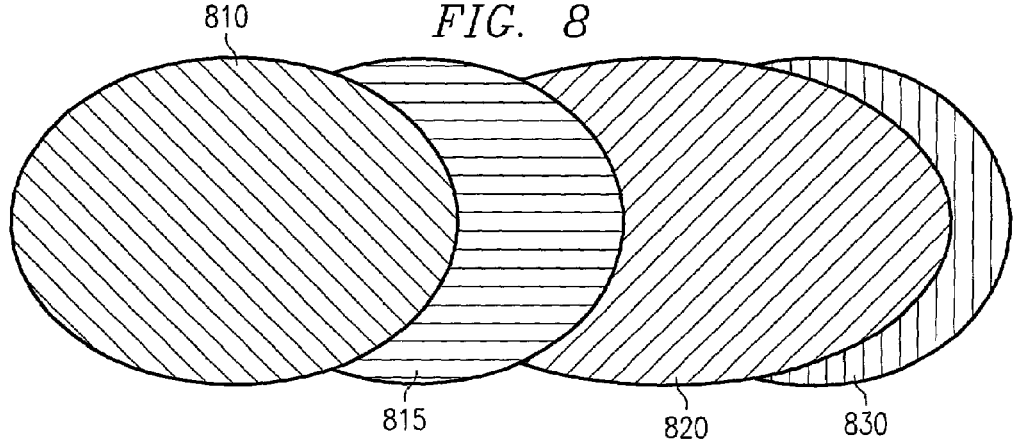

| FLIGHT TEST NUMBER | % ESTIMATE OF NEW INFORMATION IN TEST WHEN COMPARED TO PREVIOUS FLIGHTS |
|---|---|
| A1 | 100.0 |
| A2 | <= 43.9 |
| B1 | <= 26.1 |
| B2 | <= 23.1 |
| B3 | <= 10.1 |
| B4 | <= 9.6 |
| B5 | <= 23.4 |
| B6 | <= 15.1 |
| B7 | <= 24.2 |
| B8 | <= 12.5 |
| B9 | <= 5.8 |
| B10 | <= 14.3 |
| B11 | <= 8.2 |
| B12 | <= 4.3 |
| B13 | <= 6.4 |
| B14 | <= 8.7 |

FIG. 12A

| MANEUVER TYPE | FLIGHT | RUN | PLANNED MACH | ALTITUDE | ATTAINED MACH | ALTITUDE | NZ G's | GROSS WEIGHT POUNDS | NZW POUNDS |
|---|---|---|---|---|---|---|---|---|---|
| 9G WIND UP TURN | A | 7 | 0.95 | 15000 | 0.86 | 15142 | 8.96 | 23586 | 211327 |
| 9G WIND UP TURN | A | 7R | 0.95 | 15000 | 0.86 | 14572 | 8.85 | 23459 | 207616 |
| 9G WIND UP TURN | A | 8 | 1.1 | 15000 | 1.02 | 15112 | 8.65 | 22935 | 198390 |
| 9G WIND UP TURN | A | 9 | 0.9 | 10000 | 0.87 | 9732 | 9.18 | 23586 | 216518 |
| 9G WIND UP TURN | A | 10 | 0.95 | 10000 | 0.9 | 9242 | 9.21 | 23426 | 215752 |
| 9G WIND UP TURN | A | 11 | 1.1 | 10000 | 1.04 | 9632 | 8.94 | 22936 | 205050 |
| 9G WIND UP TURN | A | 12 | 0.8 | 5000 | 0.76 | 4632 | 8.97 | 23673 | 212348 |
| 9G WIND UP TURN | A | 13 | 0.9 | 5000 | 0.9 | 4872 | 9.15 | 23489 | 214923 |
| 9G WIND UP TURN | A | 14 | 0.95 | 5000 | 0.92 | 4832 | 9.1 | 23207 | 211186 |
| 9G WIND UP TURN | C | 15 | 1.1 | 5000 | 1.07 | 4852 | 8.94 | 23028 | 205867 |
| 5.86G 180 ROLL (R) | C | 15AL | 1.2 | 5000 | 1.08 | 4822 | 5.97 | 22751 | 135825 |
| 5.86G 180 ROLL (R) | C | 15AR | 1.2 | 5000 | 1.07 | 5432 | 5.92 | 22771 | 134804 |
| 5.86G 180 ROLL (R) | C | 15ARR | 1.2 | 5000 | 1.17 | 5272 | 5.97 | 23076 | 137763 |
| 5.86G 180 ROLL (R) | C | 15ARR2 | 1.2 | 5000 | 1.18 | 6312 | 6.06 | 23139 | 140224 |
| 9G WIND UP TURN | C | 15R | 1.1 | 5000 | 0.98 | 4432 | 9.03 | 22994 | 207634 |
| STEADY SIDESLIP (L) | C | 17L | 0.9 | 5000 | 0.89 | 4952 | 1.15 | 23693 | 27247 |
| STEADY SIDESLIP (R) | C | 17RR | 0.9 | 5000 | 0.9 | 4822 | 1.1 | 23120 | 25432 |
| 5.86G 180 ROLL (L) | R | 15ALR | 1.2 | 5000 | 1.19 | 6262 | 2.2 | 23447 | 51583 |
| 5.86G 180 ROLL (L) | R | 15ALR2 | 1.2 | 5000 | 1.19 | 5252 | 6.31 | 22317 | 140821 |
| 5.86G 180 ROLL (L) | R | 15ALR3 | 1.2 | 5000 | 1.18 | 5232 | 6.07 | 23090 | 140157 |
| 5.86G 180 ROLL (L) | R | 15ALR4 | 1.2 | 5000 | 1.17 | 5122 | 6.18 | 22242 | 137455 |
| 5.86G 180 ROLL (R) | R | 15AR | 1.2 | 5000 | 1.18 | 6272 | 6.17 | 22780 | 140553 |

TO FIG. 12B

FIG. 12B   FROM FIG. 12A

| MANEUVER TYPE | FLIGHT | RUN | PLANNED MACH | ALTITUDE | ATTAINED MACH | ALTITUDE | NZ G's | GROSS WEIGHT POUNDS | NZW POUNDS |
|---|---|---|---|---|---|---|---|---|---|
| 5.86G 360 ROLL (L) | R | 16L | 1.2 | 5000 | 1.16 | 4362 | 6.07 | 23239 | 141060 |
| 5.86G 360 ROLL (L) | R | 16LR | 1.2 | 5000 | 1.15 | 3982 | 6.1 | 22381 | 136524 |
| 5.86G 360 ROLL (L) | R | 16LR2 | 1.2 | 5000 | 1.2 | 5332 | 6.31 | 23141 | 146022 |
| 5.86G 360 ROLL (R) | R | 16R | 1.2 | 5000 | 1.15 | 4522 | 6.1 | 22825 | 139231 |
| 5.86G 360 ROLL (R) | R | 16RR | 1.2 | 5000 | 1.16 | 5672 | 6.04 | 23182 | 140017 |
| 5.86G 360 ROLL (R) | R | 16RR2 | 1.2 | 5000 | 1.17 | 4612 | 6.04 | 22892 | 138270 |
| 5.86G 360 ROLL (L) | T | 7L | 0.9 | 2000 | 0.94 | 3572 | 6.44 | 23037 | 140361 |
| 5.86G 360 ROLL (L) | T | 7LR | 0.9 | 2000 | 0.9 | 3232 | 6.17 | 22824 | 140827 |
| 5.86G 360 ROLL (L) | T | 7LR2 | 0.9 | 2000 | 0.93 | 3512 | 6.37 | 22596 | 143938 |
| 5.86G 360 ROLL (R) | T | 7R | 0.9 | 2000 | 0.9 | 3592 | 6.08 | 23702 | 144109 |
| 5.86G 360 ROLL (R) | T | 7RR | 0.9 | 2000 | 0.95 | 2522 | 6.55 | 23615 | 154678 |
| 5.86G 360 ROLL (R) | T | 7RR2 | 0.9 | 2000 | 0.91 | 2532 | 6.44 | 23479 | 151203 |
| 5.86G 360 ROLL (R) | T | 7RR3 | 0.9 | 2000 | 0.92 | 2872 | 6.48 | 23270 | 150790 |
| 5.86G 360 ROLL (L) | T | 8L | 0.95 | 2000 | 0.95 | 3172 | 6.42 | 23387 | 150145 |
| 5.86G 360 ROLL (L) | T | 8LR | 0.95 | 2000 | 0.98 | 1972 | 6.26 | 23144 | 144884 |
| 5.86G 360 ROLL (L) | T | 8LR2 | 0.95 | 2000 | 0.95 | 2792 | 6.44 | 22830 | 147022 |
| 5.86G 360 ROLL (L) | T | 8LR3 | 0.95 | 2000 | 0.96 | 3562 | 6.54 | 22582 | 102521 |
| 5.86G 360 ROLL (R) | T | 8R | 0.95 | 2000 | 0.96 | 2902 | 6.44 | 23542 | 151613 |
| 5.86G 360 ROLL (R) | T | 8RR | 0.95 | 2000 | 0.96 | 2732 | 6.54 | 23305 | 152411 |
| 5.86G 360 ROLL (R) | T | 8RR2 | 0.95 | 2000 | 0.94 | 3192 | 6.55 | 22766 | 149119 |
| 5.86G 360 ROLL (R) | T | 8RR5 | 0.95 | 2000 | 0.96 | 3562 | 6.49 | 22839 | 148226 |
| 5.86G 360 ROLL (R) | T | 8RR6 | 0.95 | 2000 | 0.96 | 3792 | 6.45 | 22451 | 144806 |

TO FIG. 12C

FROM FIG. 12B

| MANEUVER TYPE | FLIGHT | RUN | PLANNED MACH | ALTITUDE | ATTAINED MACH | ALTITUDE | NZ G's | GROSS WEIGHT POUNDS | NZW POUNDS |
|---|---|---|---|---|---|---|---|---|---|
| 5.86G 360 ROLL (R) | T | 8RR7 | 0.95 | 2000 | 0.97 | 3692 | 6.45 | 23504 | 151600 |
| 5.86G 360 ROLL (R) | T | 8RR8 | 0.95 | 2000 | 0.96 | 3192 | 6.51 | 23164 | 150798 |
| 5.86G 360 ROLL (L) | T | 9L | 1.1 | 2000 | 1.07 | 3022 | 6.04 | 22281 | 134578 |
| 5.86G 360 ROLL (L) | T | 9LR | 1.1 | 2000 | 1.04 | 3872 | 6.11 | 23435 | 143189 |
| 5.86G 360 ROLL (L) | T | 9LR2 | 1.1 | 2000 | 1.07 | 3852 | 5.97 | 22742 | 135768 |
| 3.5G 360 ROLL (L) | V | 10LR | 1.2 | 2000 | 1.15 | 2372 | 3.56 | 22427 | 79840 |
| 3.5G 360 ROLL (L) | V | 10LR2 | 1.2 | 2000 | 1.18 | 2272 | 3.71 | 23058 | 85544 |
| 5.86G 360 ROLL (L) | V | 9L | 1.1 | 2000 | 1.07 | 3762 | 5.77 | 22912 | 132203 |
| 5.86G 360 ROLL (R) | V | 9R | 1.1 | 2000 | 1.07 | 3032 | 5.92 | 22151 | 131132 |
| 5.86G 360 ROLL (R) | V | 9RR | 1.1 | 2000 | 1.09 | 3332 | 5.8 | 23189 | 134494 |
| 5.86G 360 ROLL (R) | V | 9RR2 | 1.1 | 2000 | 1.07 | 3572 | 5.83 | 23247 | 135529 |
| 3.5G 180 ROLL (L) | W | 10L | 1.2 | 2000 | 1.13 | 3742 | 3.53 | 23285 | 82196 |
| 3.5G 180 ROLL (R) | W | 10R | 1.2 | 2000 | 1.11 | 3832 | 3.24 | 23198 | 75161 |
| 3.5G 180 ROLL (R) | W | 10RR | 1.2 | 2000 | 1.11 | 2432 | 3.32 | 22679 | 75293 |
| 4.5G 180 ROLL (L) | W | 11L | 1.2 | 2000 | 1.13 | 3492 | 3.82 | 22611 | 86372 |
| 4.5G 180 ROLL (R) | W | 11R | 1.2 | 2000 | 1.11 | 3872 | 4.2 | 23178 | 97348 |
| 5.86G 180 ROLL (L) | W | 12L | 1.2 | 2000 | 1.15 | 3272 | 5.1 | 23450 | 119593 |
| 5.86G 180 ROLL (R) | W | 12R | 1.2 | 2000 | 1.15 | 2532 | 5.42 | 23450 | 127097 |
| 1G 180 ROLL (L) | W | 13L | 1.2 | 2000 | 1.13 | 4312 | 1.52 | 22460 | 34140 |
| 1G 180 ROLL (L) | W | 13LR | 1.2 | 2000 | 1.15 | 2452 | 3.61 | 22945 | 82830 |
| 1G 180 ROLL (R) | W | 13R | 1.2 | 2000 | 1.13 | 4322 | 0.99 | 22354 | 22130 |

METHOD TO OPTIMIZE TEST DATA

BACKGROUND OF THE INVENTION

1. Technical Field

The present invention relates generally to the field of system tests and more specifically to determining whether a testing maneuver involving multi-state variables produces new data.

2. Description of the Related Art

Aircraft flight tests are expensive and time-consuming aspects of certifying aircraft for use. Typically, a number of flight tests will be conducted for an aircraft, wherein each flight test will consist of a number of prearranged maneuvers. During the flight test, instruments will record various data relating to the aircraft during the tests.

While the flight tests do not repeat maneuvers from previous flight tests or maneuvers, often some maneuvers will not add additional information regarding the aircraft from the data, which has been previously recorded during other maneuvers. When no new data is added by a maneuver, from a pure new data acquisition model, maneuvers could be candidates for modification or removal from the flight test in order to maintain the efficiency, both in terms of time and costs of the flight-test.

BRIEF SUMMARY OF THE INVENTION

A method for optimizing data gathering, is provided wherein the method comprising the steps of designing a first system test comprising two or more maneuvers, compiling one or more data variables for each of the two or more maneuvers from the first system test, pooling each data variable from each maneuvers into a first set of data, removing a first maneuver's data variables from the pooled first set of data, comparing the first maneuver's data variables against the first set of data with the first maneuver's data variables removed, and determining whether to perform the first maneuver based on whether the maneuver provided new data.

A method for optimizing data gathering is provided wherein the method comprising the steps of performing a first system test, compiling a first set of test data from the first system test, designing a second system test, compiling a second set of test data from the second system test, comparing the first data set to the second data set, and determining whether to perform the second test based on the comparing step.

A system for optimizing data gathering comprising of a first set of data gathered from a first system test, a second set of data from a second system test, and an algorithm for comparing the first set of data to the second set of data, wherein the algorithm provides an optimization result.

An apparatus for optimizing data gathering comprising of a computer, a first data set from a first system test, a second set of data from a second system test and an algorithm running on the computer, wherein the algorithm compares the first set of data to the second set of data and provides a result.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 7A shows an example of one pair of variables, vertical load and lateral acceleration;

FIG. 7B shows an example of one pair of variables, lateral acceleration and roll acceleration;

FIG. 7C shows an example of one pair of variables, lateral acceleration and angle of attack;

FIG. 8 illustrates a data subset analysis figure depicting a comparison of one flight vs. a training file of the previous flights taken;

FIG. 12A illustrates maneuver candidates for elimination;

FIG. 12B illustrates different maneuver candidates for elimination;

FIG. 12C illustrates different maneuver candidates for elimination

DETAILED DESCRIPTION OF THE PREFERRED EMBODIMENT

The present invention comprises of an advanced pattern recognition algorithm coupled with fault detection model based on a set of statistical hypothesis tests. One such advanced pattern recognition algorithm, developed by Argonne National Laboratory and titled the Multivariate State Estimation Technique (MSET), has demonstrated the capability of identifying the amount of useful information in a test file composed of multivariate data when compared to the information contained in a training file data base. The present invention using algorithms such as MSET (other suitable algorithms can be used) is capable of analyzing situations where thousands of different variables are utilized. These attributes provide the present invention with the capability of enhancing any data gathering process including flight test. The MSET algorithm was created under contract with the United States Government.

Utilization of the present invention to determine the amount of useful information in a test file when compared to the information in a training file involves a training phase, a system phase and a testing phase. In the training phase, the present invention utilizes the training file to establish normal data boundaries and "trains itself" to recognize normal process behavior and correlations between variables or sensors.

In the system phase, an estimate of each data point in the test file is calculated by comparing the test file data point values with comparable data points in the training file. The difference between the test file data point value and the estimate (the estimation error) is then analyzed in the testing phase by a statistically based hypothesis test to determine which test file data points contain useful information values (i.e., which test data points are significantly and meaningfully different from the data points already accumulated).

The major criteria for successful application of the present invention involves a small degree of mutual correlation among the sensor readings that are gathered. Major decisions encountered when applying the present invention involve determining the parameter settings (the mean test disturbance magnitude, the variance test disturbance magnitude, the false alarm probability, or the missed alarm probability, for example). Different parameter settings increase or decrease the sensitivity of the algorithm.

The following figures and descriptions illustrate the present invention's ability to detect new information in a test file when compared to existing information in a training file when using theoretical distributions.

Figure 1A:
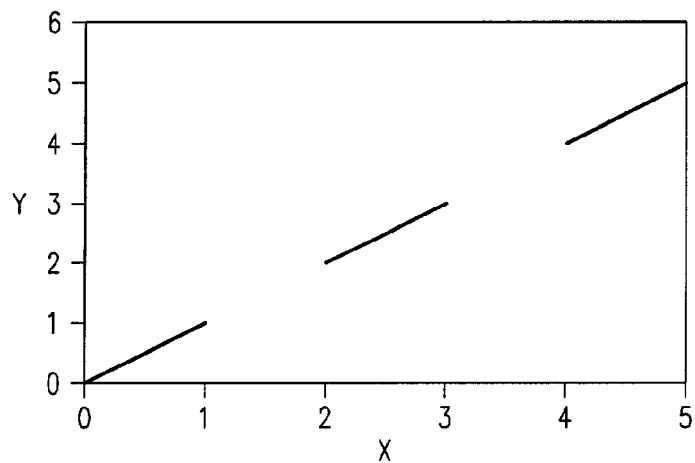
FIG. 1A shows a training file of the equation X=Y between 0<X<1, 2<X<3, and 4<X<5.
Figure 1B:
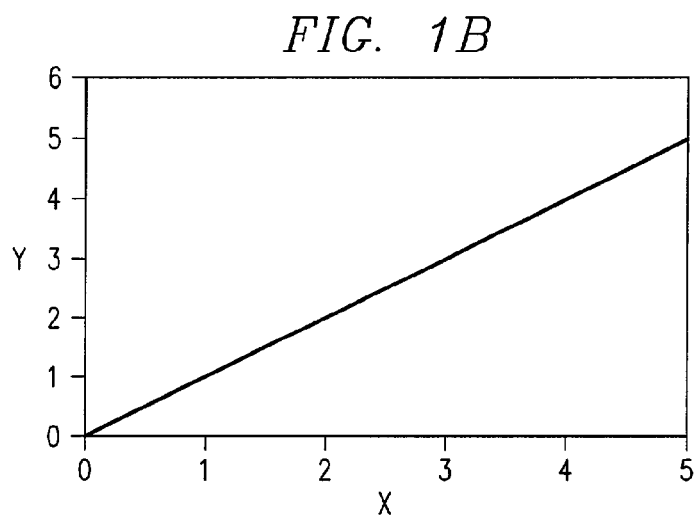
FIG. 1B shows the same equation X=Y, range 0<X<5, but without the training file data gaps.

FIG. 1A shows an example of a training file of the equation $X=Y$ between $0<X<1, 2<X<3$, and $4<X<5$. The variables in this distribution have a high degree (correlation coefficient $r=1.0$) of correlation. The test file shown in FIG. 1B contains the same equation $X=Y$, range $0<X<5$, but without the training file data gaps.

Figure 1C:
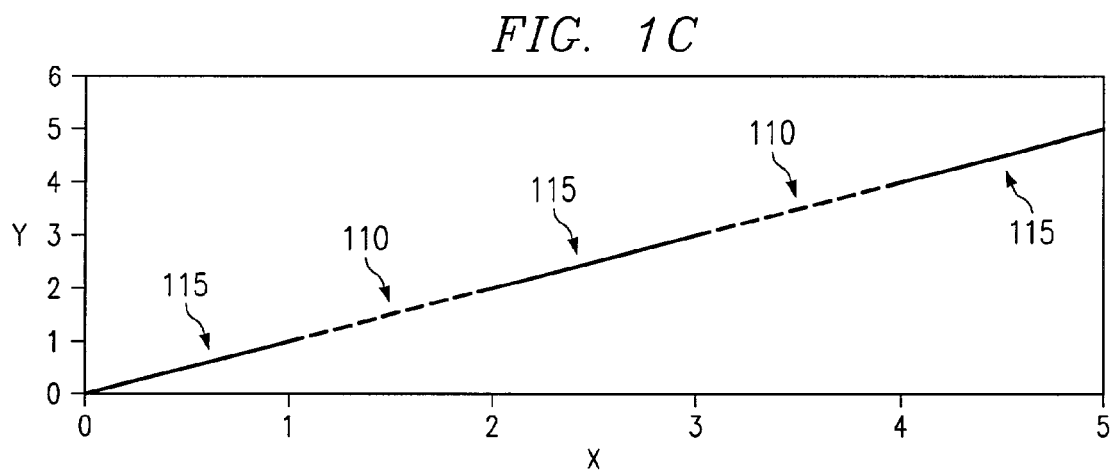
FIG. 1C shows a pattern recognition comparison between the training file vs. the test file.

A pattern recognition comparison between the training file vs. the test file (shown in FIG. 1C) highlights the data 110 found in the test file not included in the training file. One might argue that the test file data 110 is "useful" data since it fills in the gaps of the training file. Test file data 115 may be considered redundant since it is already included in the training file. Hence the amount of "useful" data contained in this test file when compared to the training file is ⅖ or 40%.

Figure 2A:
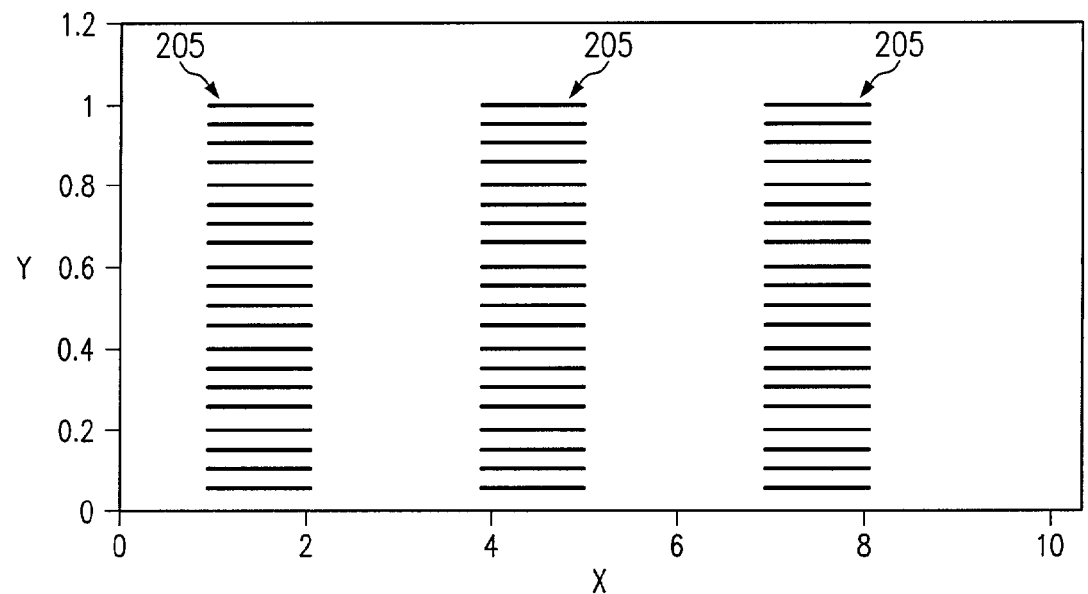
FIG. 2A shows a non-normal distribution of training file data arranged in three blocks.
Figure 2B:
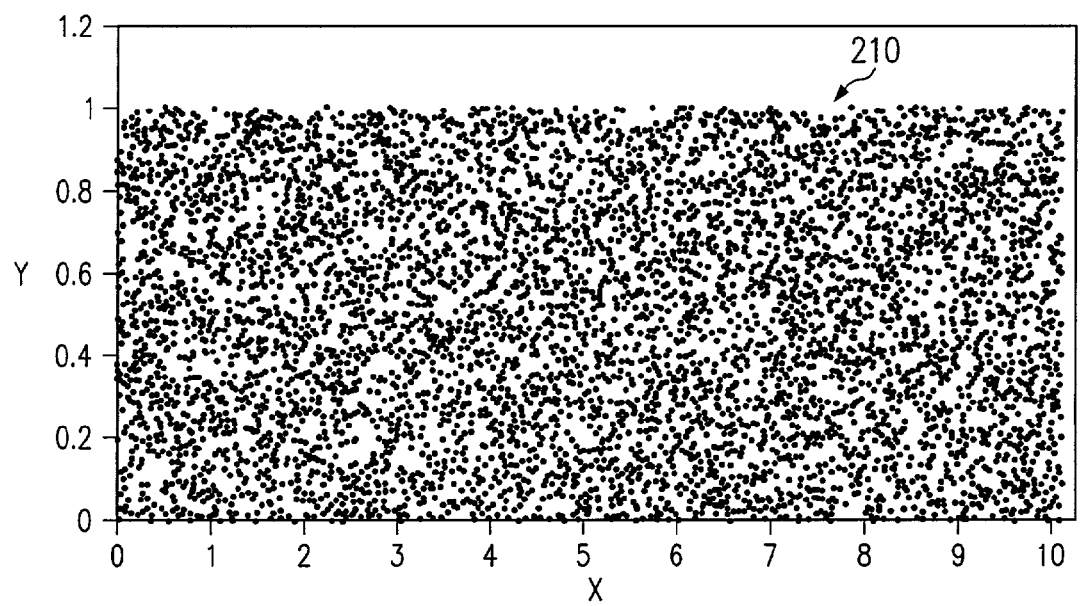
FIG. 2B shows a test file of random data covering the range 0<X<10 and 0<Y<1.
Figure 2C:
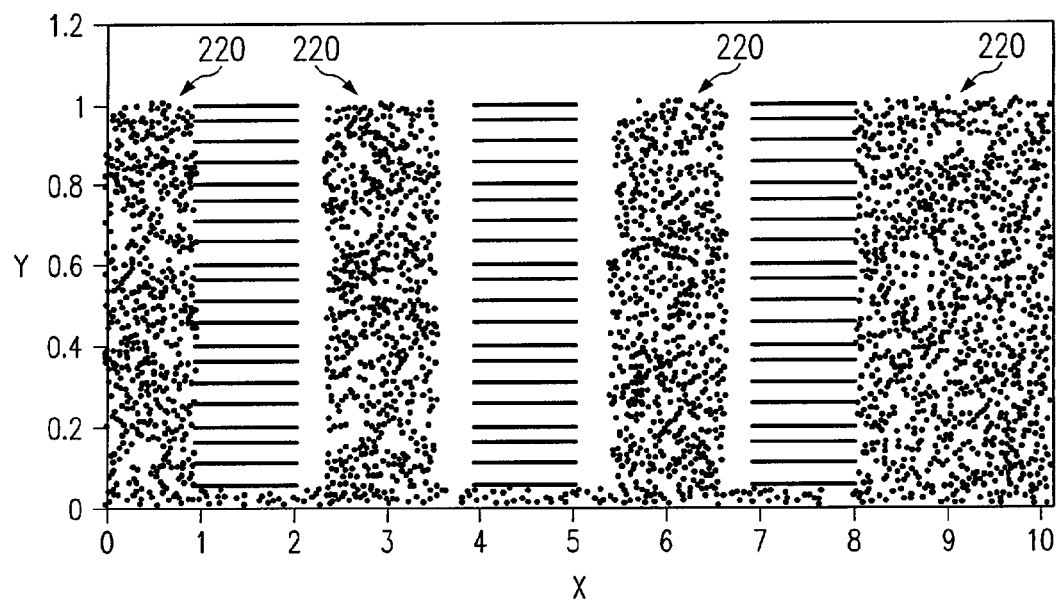
FIG. 2C shows the present invention highlighting those test file data points outside of the training file.
Figure 2D:
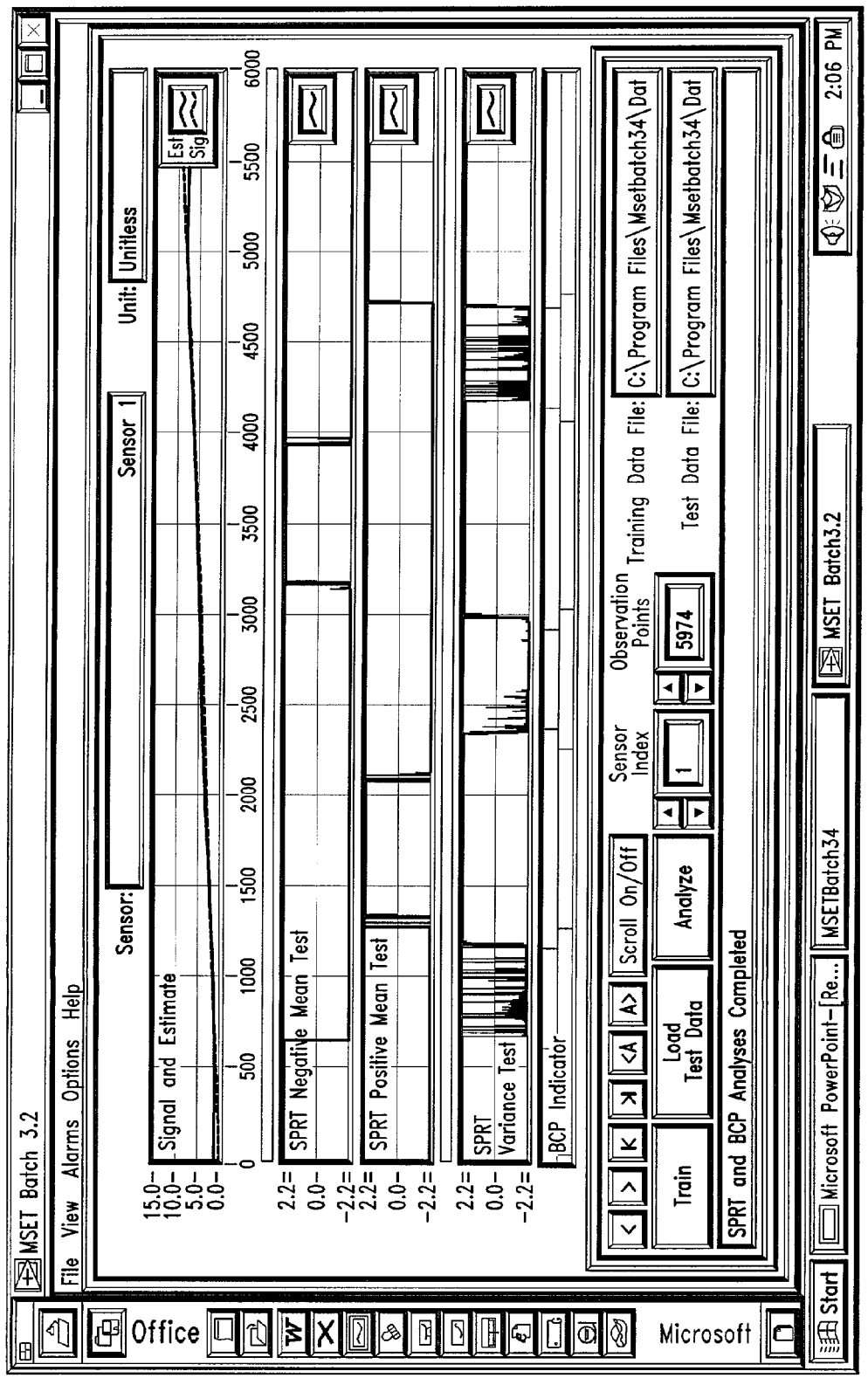
FIG. 2D shows the present invention's electronic screen display of the test file output which provided the data necessary to create FIG. 2C.

FIG. 2A shows a non-normal distribution of Training File data arranged in three blocks 205. Correlation between X and Y is almost zero ($r=-0.0124$). A Test File of random data 210 (see FIG. 2B) covers the range $0<X<10$ and $0<Y<1$. The present invention may not have been expected to perform well under these circumstances, because the correlation between the two variables in the training file is almost non-existent. Yet FIG. 2C illustrates that the present invention is able to highlight those test file data points 220 outside of the training file. FIG. 2D shows the present invention's electronic screen display of the test file output which provided the data necessary to create FIG. 2C.

To illustrate the importance of the present invention is parameter called the disturbance magnitude (DM), a training file and a test file were both generated at random from the same trivariate (three variable) distribution with a correlation coefficient between XY of $r=0.791$ and between XZ of $r=-0.367$. Alpha (probability of wrongful rejection) and beta (probability of wrongful acceptance) remained fixed at 0.1 throughout the test. The disturbance magnitude for the mean test specifies the number of standard deviations that the mean of the alternative hypothesis distribution is shifted relative to the null hypothesis distribution.

Figure 3A:
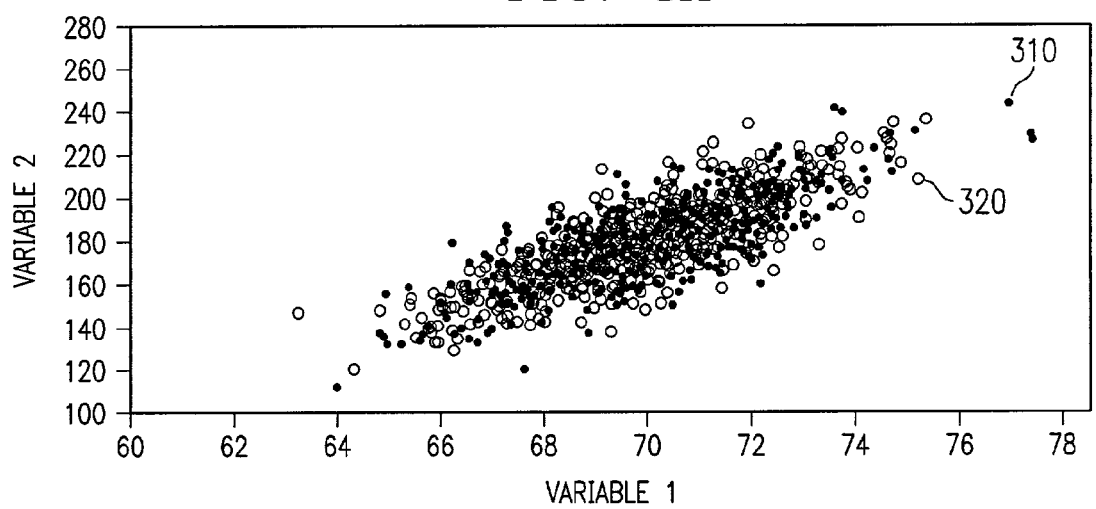
FIG. 3A shows a tri-variate training file versus a test file results, the example using one pair of variables with DM at 35.
Figure 3B:
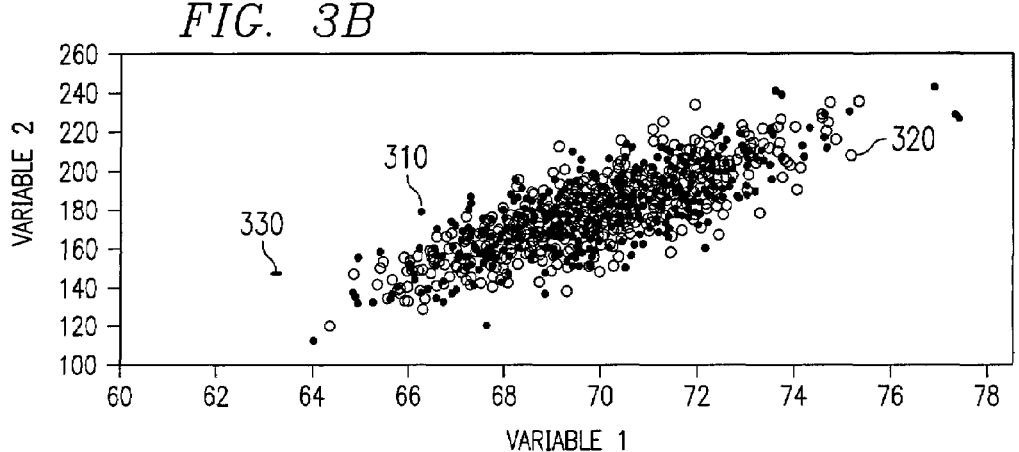
FIG. 3B shows the data from FIG. 3A with the DM at 15.
Figure 3C:
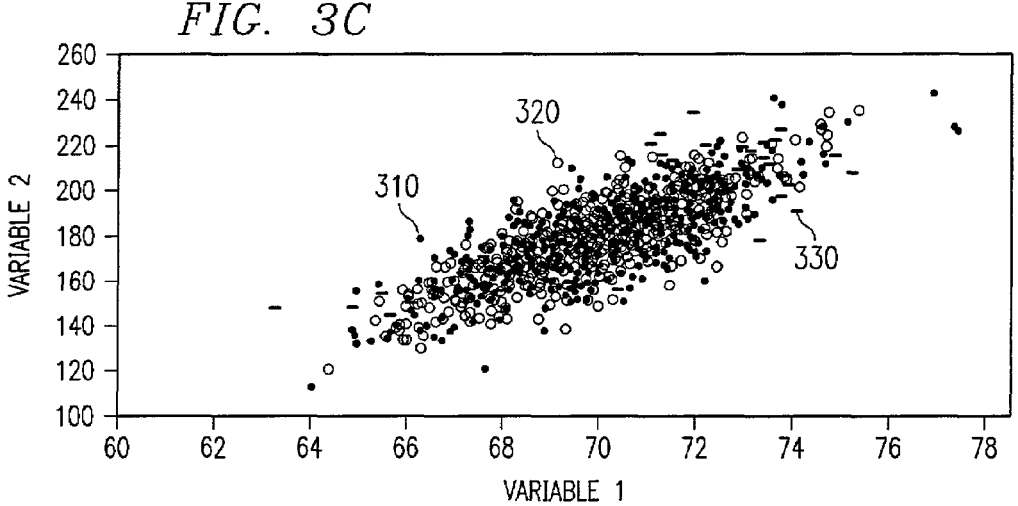
FIG. 3C shows the data from FIG. 3A with DM at 7.

Because both files illustrated in FIG. 3A were generated from the same distribution, the present invention (with a DM=35) found no useful data in the test file as illustrated in FIG. 3A. In FIG. 3A, training file data 310 (solid dots) and test file data 320 (hollow dots) subsume all new data, therefore no new data is provided. However, as we increase the sensitivity of the algorithm (e.g., reduce the DM down to 15 and then down to 7) the number of data points identified in the test file as being useful increases (see FIG. 3B and 3C). In FIG. 3B, new data 330 (dashes) are present in the graph, while in FIG. 3C, more new data 330 is present. Hence, when using pattern recognition algorithms of this type, it should be noted that a delicate balance must be achieved when setting parameters to accurately identify useful information.

Figure 4:
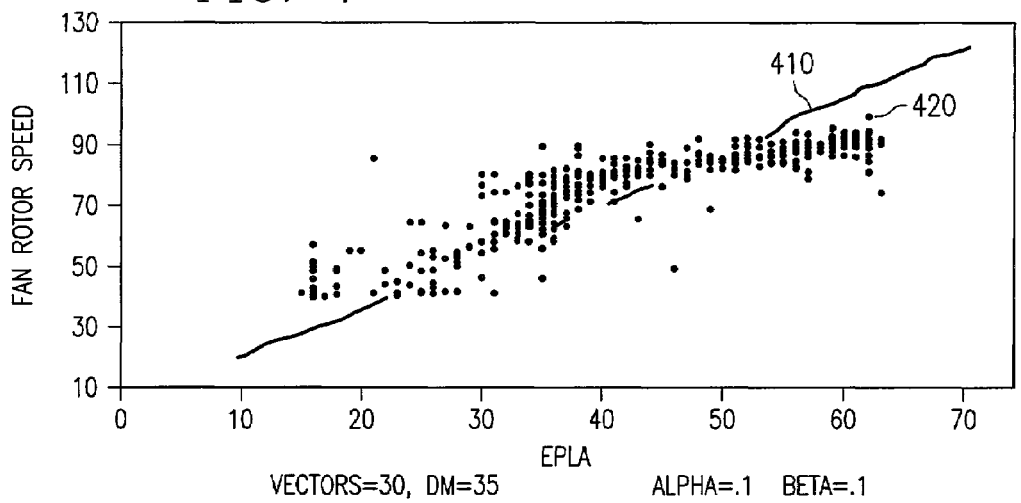
FIG. 4 shows the present invention's ability to detect new information in a test file when using aircraft data distributions.

FIG. 4 illustrates the present inventions ability to detect new information in a test file when using aircraft data distributions. FIG. 4 shows a comparison of a theoretical distribution vs. a distribution of aircraft data. A training file composed of data variables (engine power Level Ev. fan rotor speed) taken from an aircraft flight is compared to a test file composed of the same two variables arranged in a diagonal line (moving randomly off center). As the test file line intersects the training file data, the portion of the data 410 (line formed from dashes) from the diagonal line test file 420 (solid dots) outside of the training file becomes apparent.

Comparisons between distributions of aircraft data demonstrate the invention's capability of determining the amount of useful in formation obtained in one distribution when compared to another. Each data point may have not two but hundreds of variables associated with it. One of the advantages in using a pattern recognition algorithm is the capability of analyzing data points associated with large numbers of variables in multi-dimensional space. For ease of illustration, comparison examples used herein are limited to graphs of two significant variables.

Figure 5:
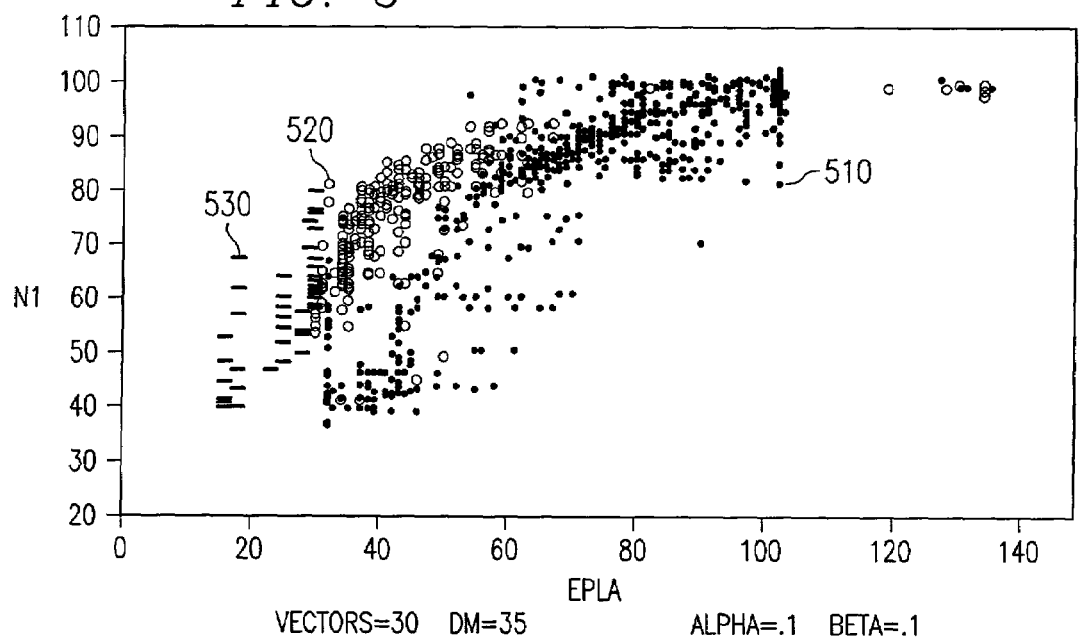
FIG. 5 shows the interactions between one of two variable combinations.

FIG. 5 shows comparison made between two aircraft flights in which data pertaining to the aircraft engine was accumulated. Data distributions of three variables (engine power level angle, fan rotor speed N1 and high pressure rotor speed N2) were utilized to illustrate the amount and location of useful data gathered in Flight XXA (test file) when compared to the engine data gathered in Flight XXB (training file). FIG. 5 represents the interactions between one of the two variable combinations. The amount of new or useful information 530 (dashes) in the test file 520 (hollow dots) and 530 when compared to the training file 510 (solid dots) was estimated to be approximately 19%.

Figure 6:
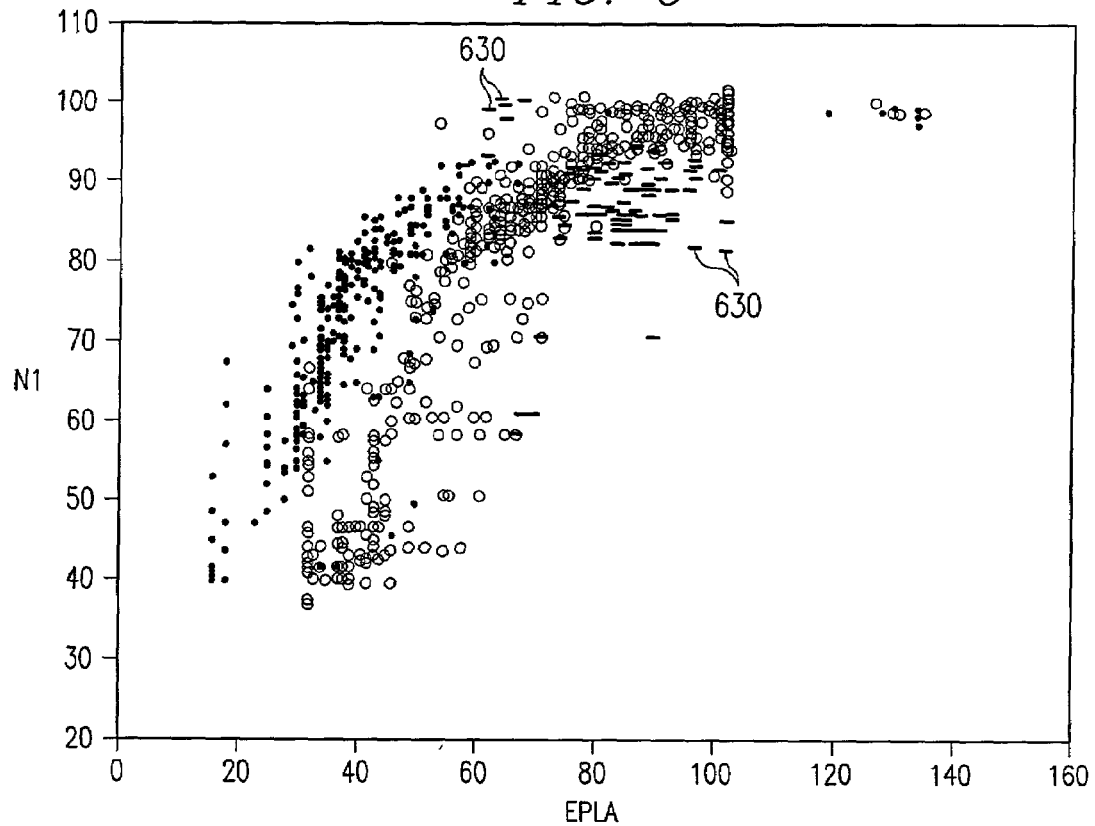
FIG. 6 shows the interactions between the two variable combinations as in FIG. 5 with a different flight used as the test file.

If Flight XXA had been flown first instead of Flight XXB and the flight engineers were interested in determining the amount of new or useful information gathered in Flight XXB (pertaining to the same three variables), Flight XXA data would be placed in the training file and Flight XXB data would be placed in the test file. FIG. 6 represents the interactions between the same two variable combinations when Flight XXB was used as the test file. The amount of new or useful information 630 (dashes) in the test file Flight XXB when compared to the training file Flight XXA (both solid and hollow dots) was estimated to be approximately 16%.

To demonstrate the ability of using this approach to identify data outside of a training file in a higher (five dimension) multivariate situation; a training file of one flight maneuver (during a flight test) was compared to a test file of another maneuver using data containing five variables associated with each data point. Run G of a particular flight, maneuver 9G wind up turn (planned mach 1.1 at 15000 feet) was used as the training file and a second flight, Run M, maneuver 5.86 g 360 roll (L) (planned mach 1.2 at 5000 feet) was used as the test file. Training and test file variables included vertical load (N2), lateral acceleration (Ny), roller acceleration, true airspeed, and angle of attack. Analysis indicated that approximately 53 per cent of the observations in the test file were outside the training file. FIGS. 7A through 7C represents the interactions between three of the variable combinations. In each of these examples, significant new data 730 (dashes) outside the training file 710 (solid dots) is identified.

To further illustrate the present invention, a flight test was conducted to gather aircraft structural data. Available flight test data was composed of 16 flights comprised of 163 maneuvers and 47,711 observations. Observational data consisted of 28 independent variables (airspeed, aircraft gross weight, angle of attack, etc.) and 33 dependent variables (vertical tail shear, center fuselage end moment, etc.). If each subsequent flight is compared with a training file composed of the previous flights, an indication is obtained of how much new and useful data is in each flight as the test is in progress. FIG. 8 illustrates a data subset analysis figure depicting a comparison of one flight vs. a training file of the previous flights taken. Subsets 810, 815 and 820 represent the training file data, wherein Subset 830 represents the percent of information from the test file that is outside the training file.

Figures 9, 10:
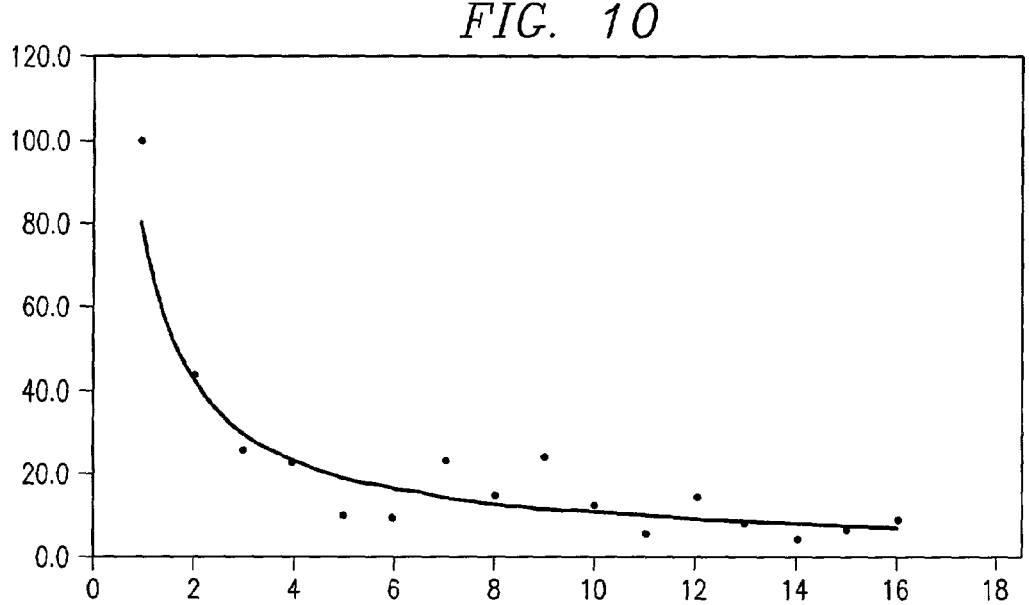
FIG. 9 displays in chart format the amount of useful information in each flight test when compared to a training file composed of all previous flights taken.
FIG. 10 illustrates the percent of useful information in each flight test (y-axis) when compared to a training file of all previous flights taken (x-axis)

Separately, FIG. 9 provides another illustration of the amount of useful information from a previously recorded flight test, in each flight test when compared to a training file composed of all previous flights taken As a test program progresses and as more data is added to the training file, the amount of new data in each flight test gradually decreases. FIG. 10 illustrates the percent of useful information in each flight test (Y axis) when compared to a training file of all previous flights taken (X axis). As the entire envelope of performance is mapped into the training file, it becomes much more difficult for subsequent test flights to add any new information. When a flight test program reaches the point at which subsequent test flights are not able to add a significant amount of new information, consideration should be given to end the flight test program.

The present invention can be used with a flight simulation to reduce flight test costs. The strategy for reducing flight test cost involves reducing the number of specific maneuvers, which contribute no new or useful information. If each maneuver is compared to a training file of all the other remaining test maneuvers combined, the resulting estimate of new information in each maneuver provides an indication of the individual maneuver's data gathering cost effectiveness. Maneuvers which display little or no significant amount of useful information or contribution to the program are eliminated from the training file before the next comparison is made until all non-contributing maneuvers are eliminated.

Figure 11:
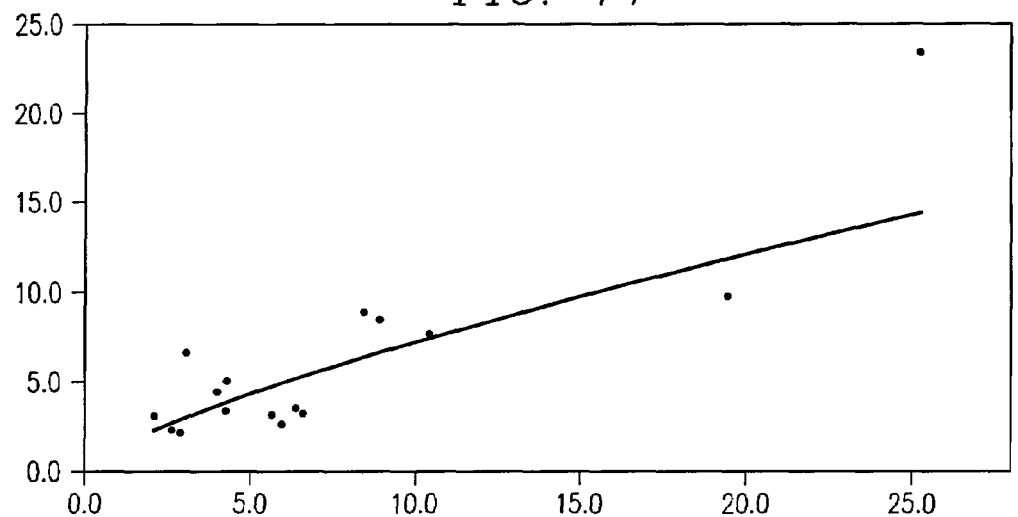
FIG. 11 illustrates the close relationship between the amount of new information in independent (y-axis) when compared to percent of useful information in independent variables (x-axis)

To illustrate this strategy, data associated with store configuration QA included within the program was analyzed to obtain a list of store configuration QA maneuver elimination candidates. Store configuration QA data consisted of 6 of 16 flight test program flights, 65 of 163 maneuvers, and 11,968 of 47,711 observation points. Observational data consisted of 28 independent variables (airspeed, aircraft gross weight, angle of attack, etc.) and 33 dependent variables (vertical tail shear, center fuselage end moment, etc.). Since only independent variable data is gathered in flight simulation, only independent variable data was used in the analysis. If simulation is used to gather data, the amount of data pertaining to dependent variables can be estimated due to the correlation between dependent and independent variables. FIG. 11 depicts a graph illustrating the close relationship between the amount of new information in independent (y-axis) when compared to percent of useful information in independent variables (x-axis). New independent variable information gathered in simulation means that new dependent variable information would be gathered in flight test.

When the present invention was applied to store configuration QA flight test data (simulation data was not available), 27 out of 65 or 41.54% of the maneuvers were deemed to provide an insignificant amount of new data and considered strong candidates for elimination providing a safety risk was not incurred (see FIGS. 12A and B). FIG. 12A illustrates maneuver candidates for elimination. FIG. 12B illustrates different maneuver candidates 1205 for elimination. Data sets were considered to provide an insignificant amount of new data if the amount of new data in the data set was less than or equal to 0.5%. The percentage of 0.5% was selected since 0.5% represented less than one data point.

Figure 13:
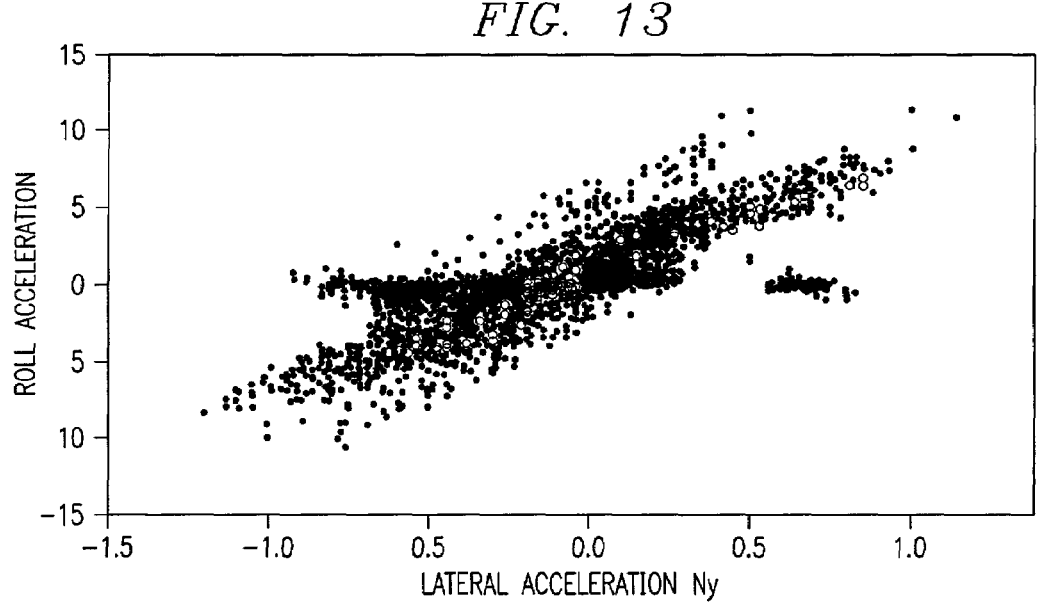
FIG. 13 shows a typical combination of variables, which shows that all of the data in the test file is indeed included in the training file.

Flight A Run 12 was one of the maneuvers identified as containing no useful data (i.e., zero new observations) when compared to a database of the other maneuvers. FIG. 13 depicts a typical combination of variables which shows that all of the data in the test file 1320 is indeed included in the training file 1310. Other two variable combinations provide similar results.

Figure 14:
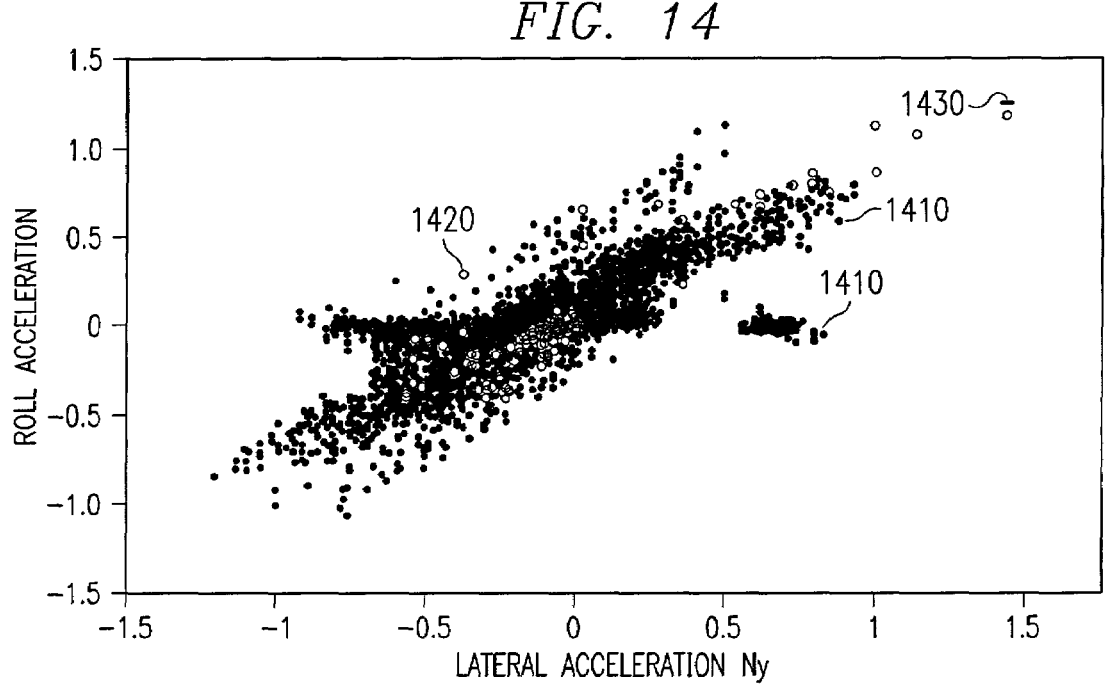
FIG. 14 illustrates at least one useful data point using the statistical parameters Flight A Run B maneuver when compared to the training file database using the same combination of variables.
Figure 15:
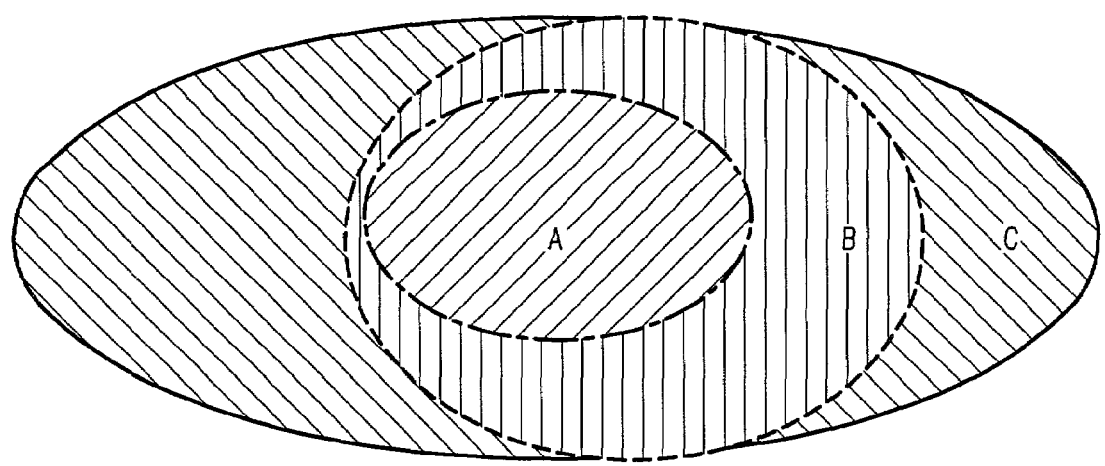
FIG. 15 illustrates an example of data gathered from three hypothetical flights.

Using the same statistical parameters Flight A Run 12 maneuver was found to have at least one useful data point 1430 (dashes) when compared to the training file data base 1410 (solid dots) and this useful point is illustrated (see FIG. 14) using the same combination of variables. FIG. 14 illustrates at least one useful data point using the statistical parameters Flight A Run 12 maneuver when compared to the training file database using the same combination of variables;

One of the major concerns when using the present invention's reduction methods involves the notion of having to gather significant amounts of redundant data until an envelope of performance is obtained. FIG. 15 provides a simple example of data gathered (in alphabetical sequence) from three hypothetical flights. If we were to apply our pattern recognition data gathering optimization analysis to this situation it would most likely find that flights A and B contain significant amounts of redundant information and are candidates for elimination. However, flights A and B were most likely needed to accomplish flight C so no reduction in flight test program cost's could have been obtained by using this method and only performing flight C.

In response to this concern, the present invention's pattern recognition flight test program cost reduction techniques would probably not provide much useful information if flight test programs could be planned using a small, manageable number of variables or sensor inputs. Unfortunately, the number of independent and dependent variables being recorded in flight-test sensors and flight recorders grows larger and larger with subsequent flight test programs. Determining if an aircraft is operating in the FIGS. 15A, B, or C range becomes a difficult task when 100 variables resulting in 4950 combinations of two variables are interacting. As the number of variables increases, the need for using pattern recognition data gathering optimization analysis to assist the flight test planner in gathering flight test data in the most cost effective manner increases.

In the above mentioned specific aircraft's store configuration flight test, 41.5% of the maneuvers showed no useful information. Most of these maneuvers were located at the beginning and at the end of the flight test program. Maneuvers located at the end of the test flight program, which provided no useful information, served little data gathering purpose and might have been considered for elimination had this tool been available. This would have reduced the flight test program by a conservative 20%.

Figure 16:
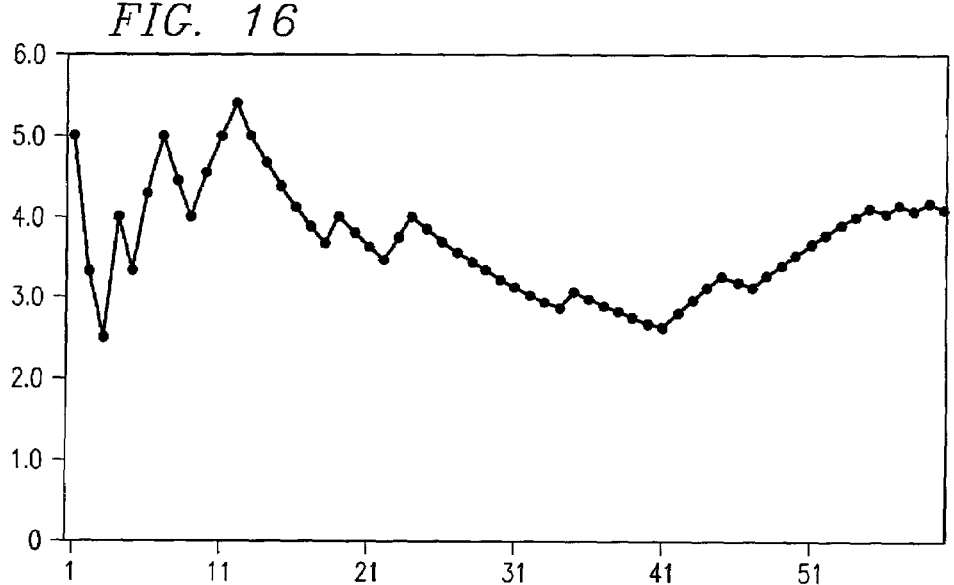
FIG. 16 illustrates the percentage of accumulated maneuvers selected as candidates for elimination (y-axis) as flight test is in progress (x-axis)
Figure 17A:
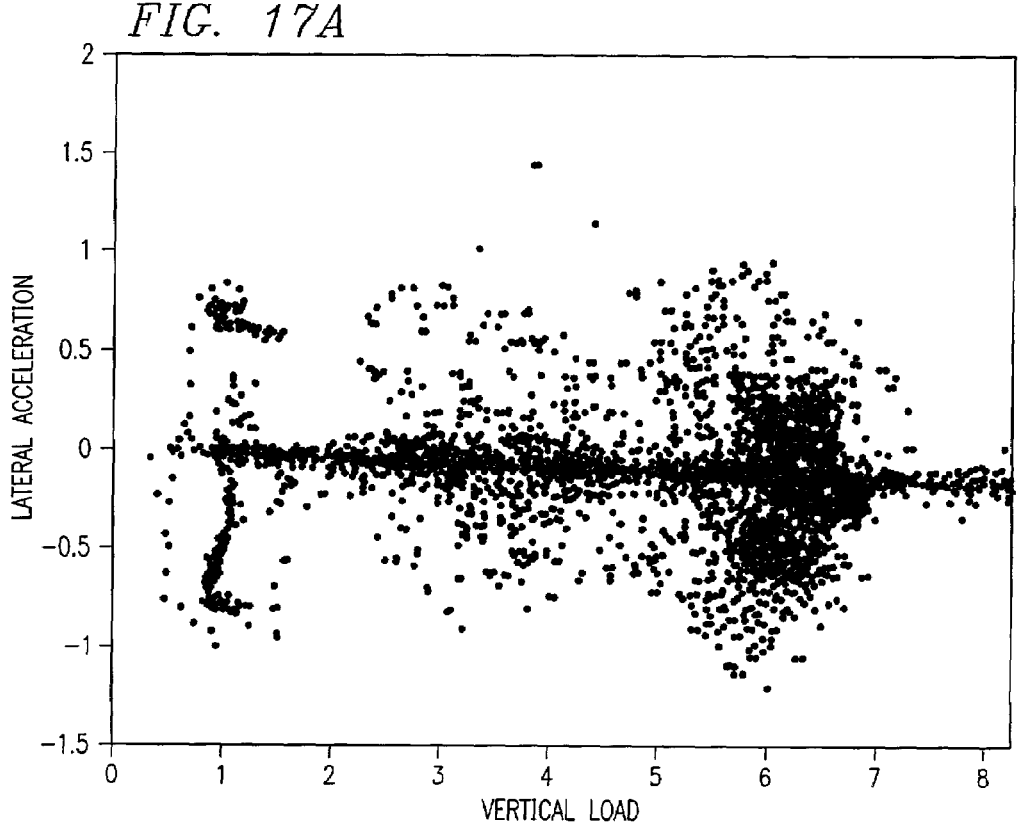
FIG. 17A illustrates a flight test with all data (vertical load vs. lateral acceleration)
Figure 17B:
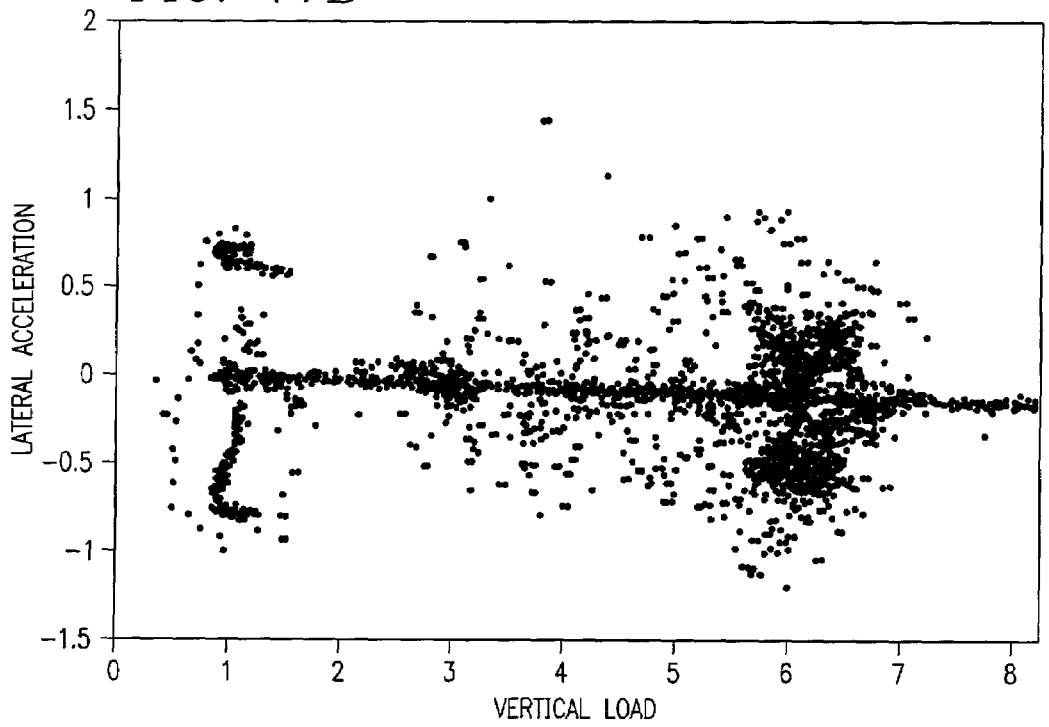
FIG. 17B illustrates a flight test after 41.1% data reduction (vertical load vs. lateral acceleration)
Figure 17C:
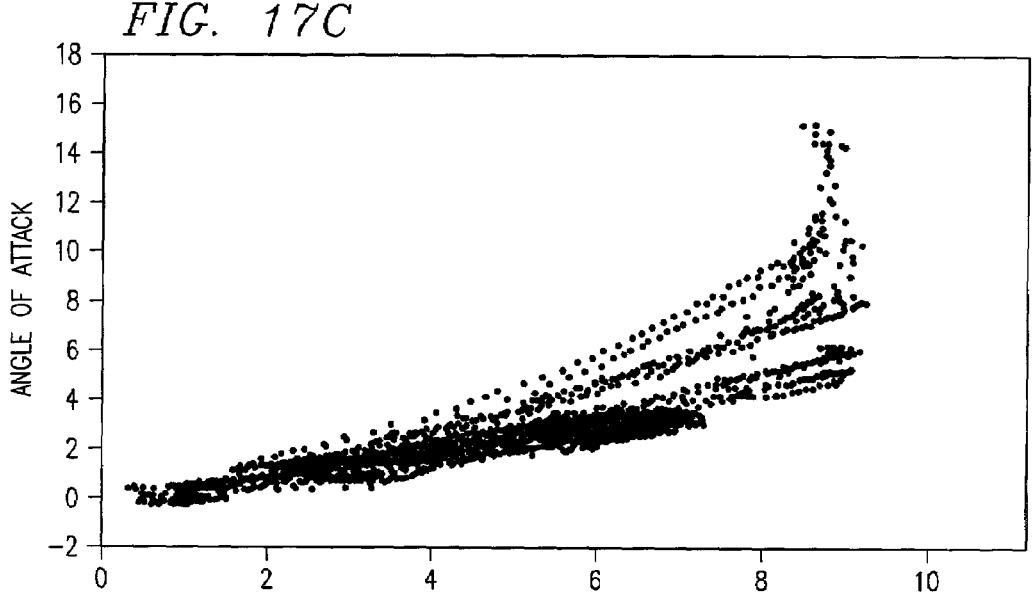
FIG. 17C illustrates a flight test with all data (vertical load vs. angle of attack)
Figure 17D:
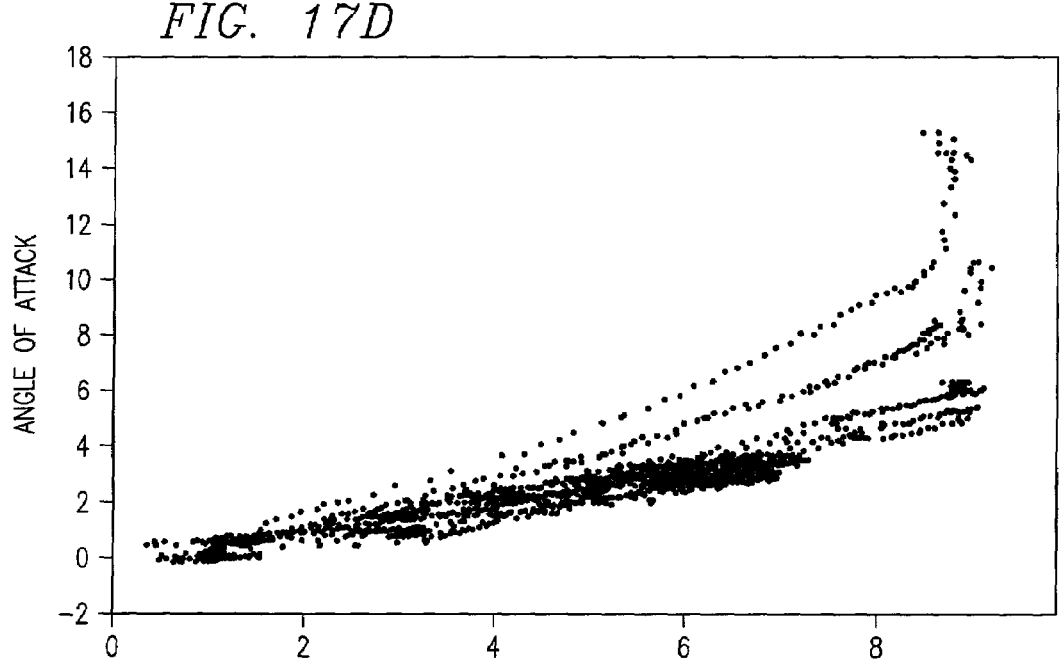
FIG. 17D illustrates a flight test after 41.1% data reduction (vertical load vs. angle of attack)
Figure 17E:
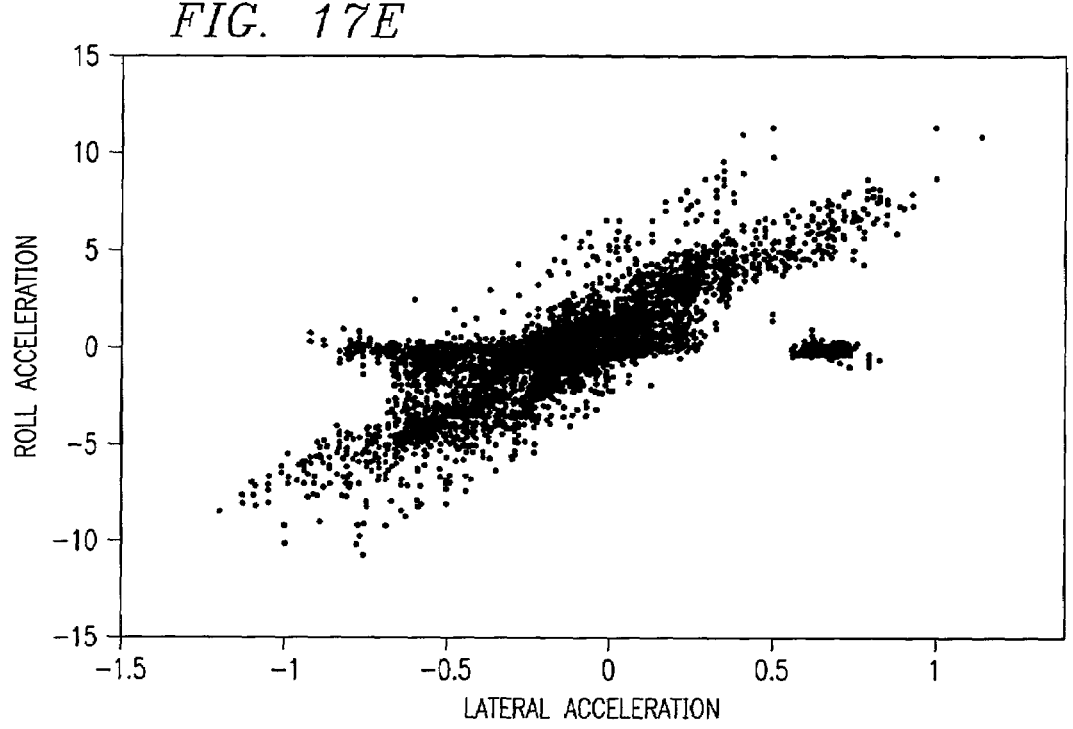
FIG. 17E illustrates a flight test with all data (lateral acceleration vs. roll acceleration)
Figure 17F:
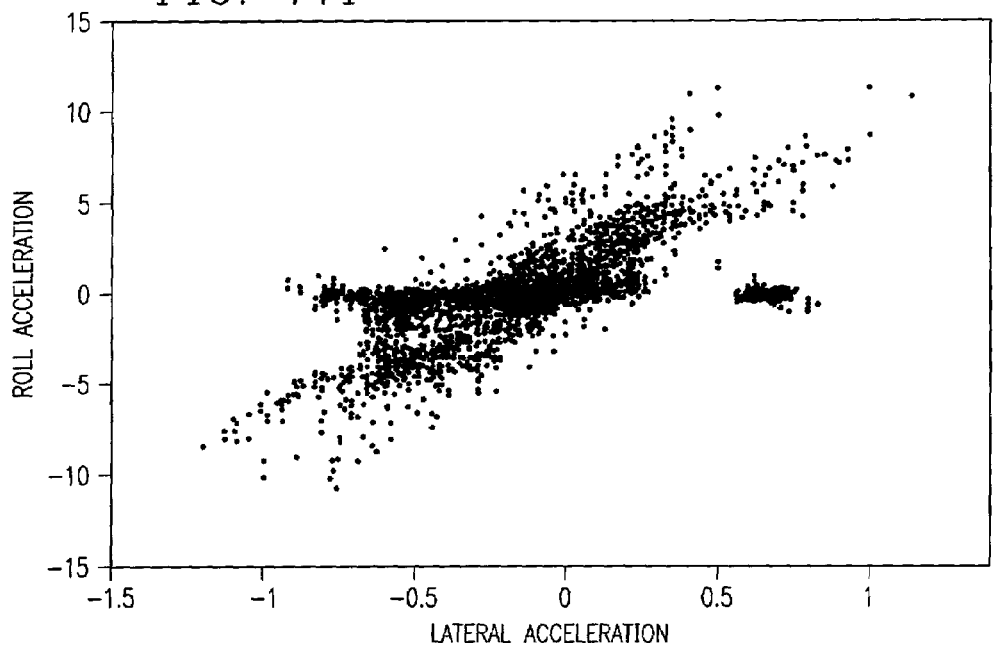
FIG. 17F illustrates a flight test after 41.1% data reduction (lateral acceleration vs. roll acceleration)
Figure 17G:
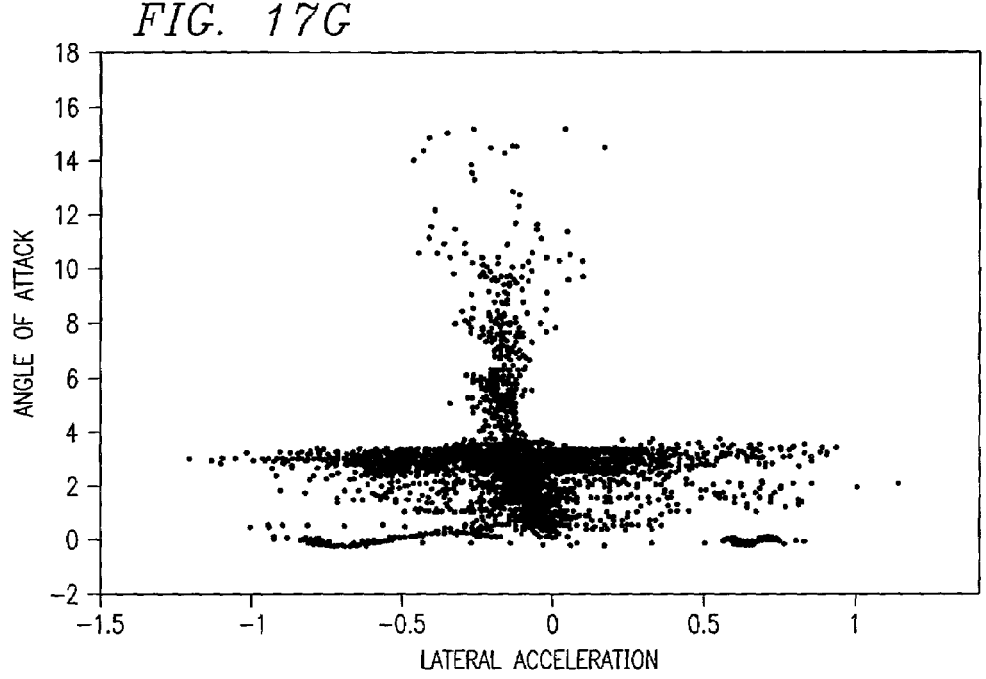
FIG. 17G illustrates a flight test with all data (lateral acceleration vs. angle of attack)
Figure 17H:
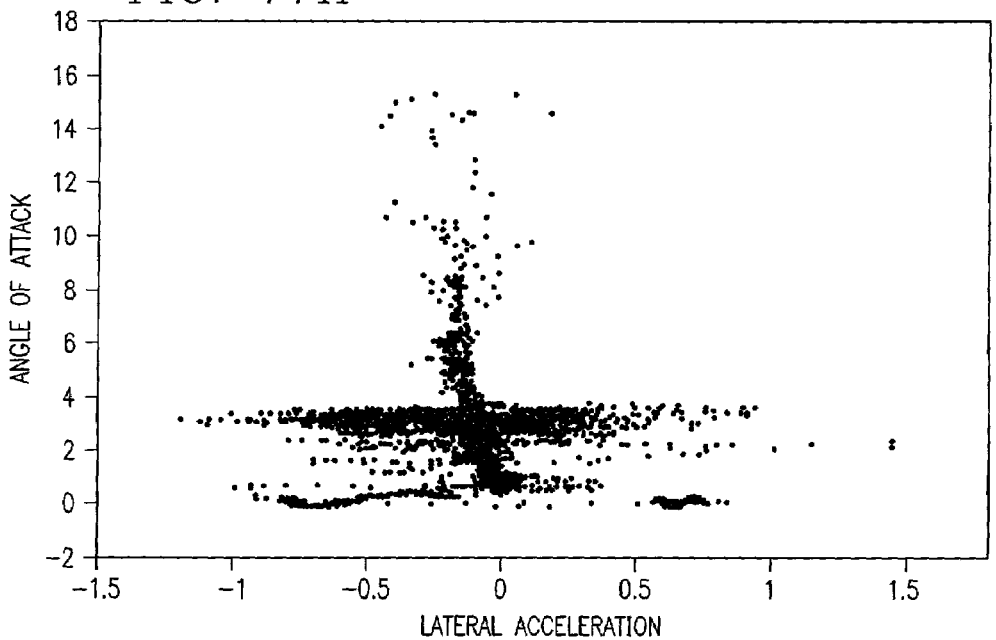
FIG. 17H illustrates a flight test after 41.1% data reduction (lateral acceleration vs. angle of attack)

FIG. 16 illustrates the percentage of accumulated maneuvers selected as candidates for elimination (Y axis) as the QA store configuration flight test program progressed (X axis). The accumulated percentage of maneuvers possessing redundant information (candidates for elimination) did not increase as the program progressed but fluctuated around 40 percent throughout the test program.

As mentioned previously, when the present invention was applied to store configuration QA flight test data, 27 out of 65 or 41.54% of the maneuvers were deemed to provide an insignificant amount of new data and considered strong candidates for elimination providing a safety risk was not incurred (see Table 12A and B). The present invention allows this information to be gathered using flight simulation before the flight test program begins and if all of the 27 non-contributing maneuvers could be removed (i.e., never flown), the amount of data in the flight test program would be reduced by 41.1% and the number of maneuvers by 41.54%. In this case of the example, each removed data point has 28 independent variables associated with it. FIGS. 17A through 17H represent several store configuration 29A flight test two variable before/after comparisons when all of the data was included and when the data from the 27 non-contributing maneuvers was removed. Significant points (points on the edge perimeters) remain even though 41.1% of the data points have been removed.

Figure 18:
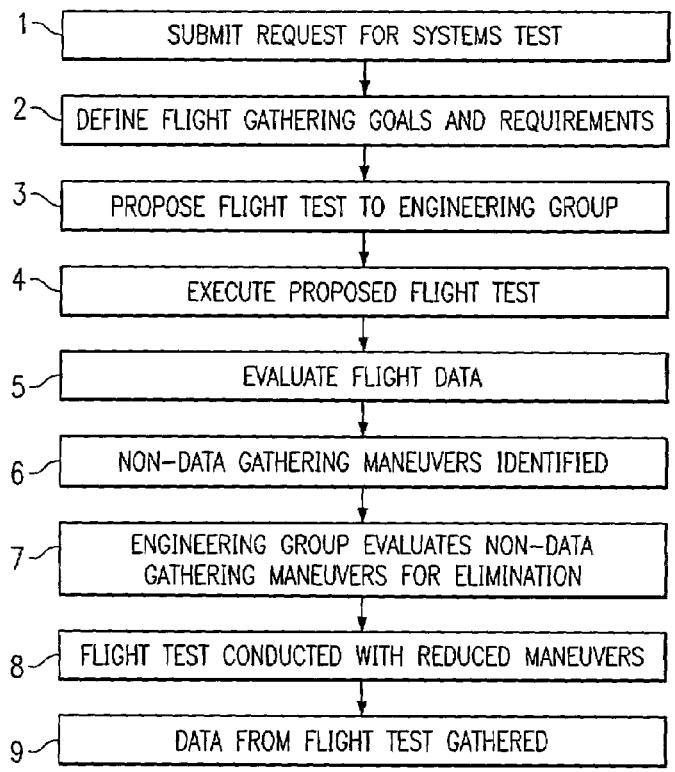
FIG. 18 illustrates in flow chart form, the methodology of the present invention.

Refer to FIG. 18, which illustrates in flow chart form, the methodology of the present invention. In step 1, a request is submitted for a system's test, in this case, a flight test for a specific aircraft. Once submitted, the flight test data gathering goals and requirements are defined in step 2. The flight test, which is composed of numerous flights and maneuvers designed to meet the data gather goals and requirements, is proposed to the flight test engineering, analysis and design group in step 3. Using their experience, the flight test engineers will design the flight test. In step 4, the proposed flight, as designed by the flight test engineering group is executed, with the various flights and maneuvers, using a simulator and the flight data is gather for analysis.

In step 5, the flight simulation data is evaluated using a data gathering optimization statistical algorithm to determine which maneuvers provide little information and should be considered as candidates for removal from the flight test. Additionally, the flights and maneuvers will be prioritized in relationship to the data gather effectiveness. In step 6, non-data gathering maneuvers from the flight test are identified as possible candidates for removal from the flight test. These are presented to the flight test engineering, analysis and design group for evaluation. Next, in step 7, the flight test engineering group determines which maneuver candidates may be eliminated and re-design the flight test using the prioritized data gathering information determined in step 5, so that the flight test is conducted in the most efficient data gathering fashion.

In step 8, the actual flight test is conducted with the reduced number of flights and maneuvers to gather the actual flight test data. In step 9, the actual flight test data gathered in step 8 is analyzed while the test is in progress to determine the actual amount of significant data being gathered, using the data gathering optimization techniques in step 5. After the completion of the flight test, the completed flight test data is also analyzed to determine the accuracy of earlier estimations based on the flight simulation data.

Figure 19:
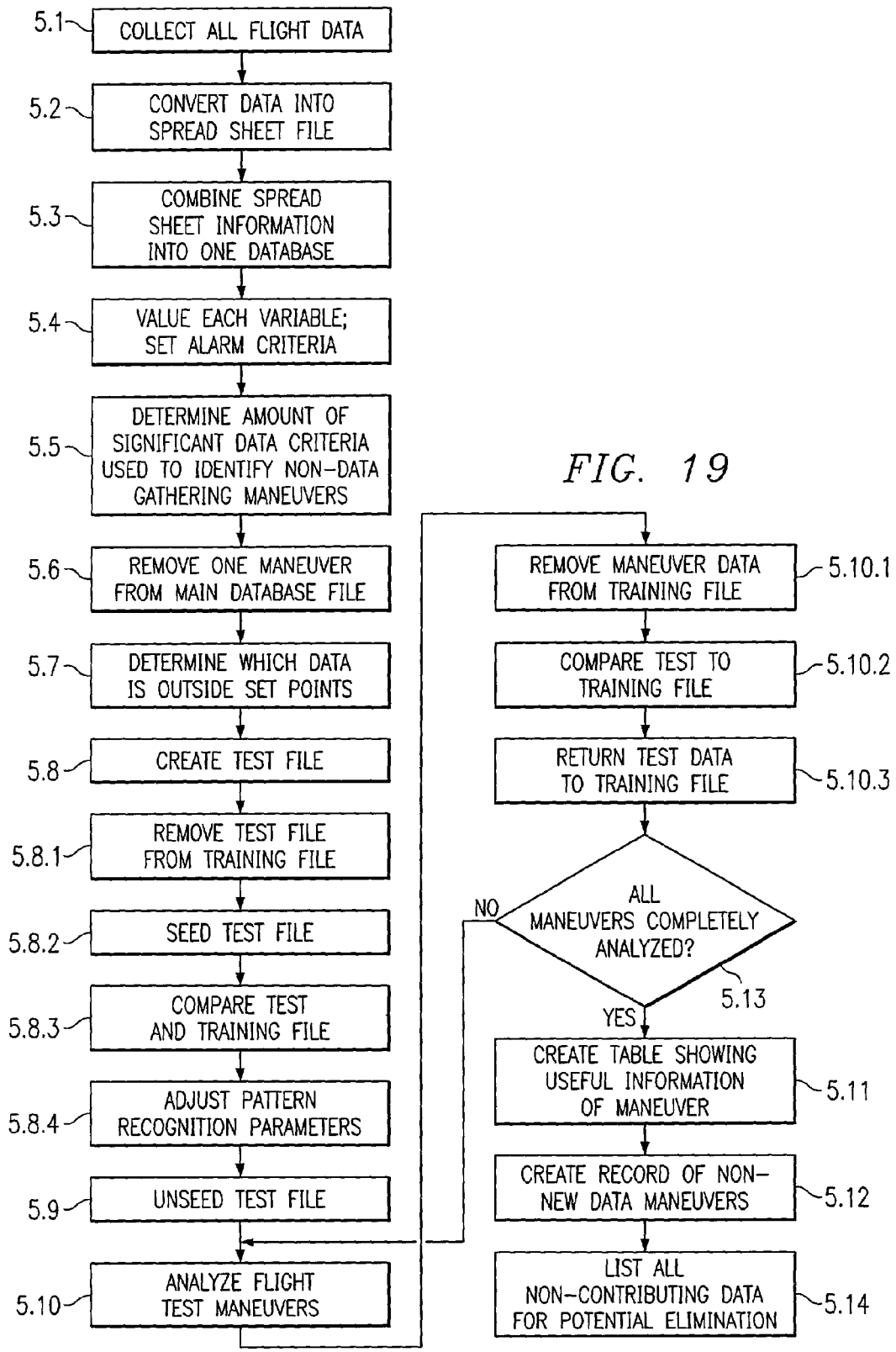
FIG. 19 illustrates step 5 of FIG. 18 in greater detail.

FIG. 19 illustrates step 5 of FIG. 18 in greater detail. In step 5.1, each flight simulation data point, which comprises of a vector composed of numerous independent variables, such as velocity, altitude, and a flight time marker indicating when the data was gathered during the flight simulation's various flights and maneuvers is collected during the simulation of the flight. In step 5.2, the flight simulation data for each flight test maneuver is converted into a database spreadsheet file with the flight test flight number, maneuver number, and time marker placed in separate columns for identification purposes. A separate row in the spreadsheet can be assigned for each data vector gathered and a separate column in the spreadsheet can be assigned for each independent variable.

In step 5.3, the spreadsheet information for each maneuver is combined into one large database file. A typical large database spreadsheet file might contain over 50,000 rows and 50 columns. In step 5.4, the importance of each independent variable associated with each vector is determined. A determination is also made for the number of independent variable alarms criteria for identifying when a vector associated with a test file is considered to be outside the data region associated with a training file. Next, in step 5.5, a determination is made for the amount of significant data criteria used in identifying those maneuvers which are non-contributing data gatherers when compared to the other maneuvers of the test flight. The significant data criteria will comprise the percent of data in a test file, which is considered to be outside the data region associated with a training file.

Next, in step 5.6, one maneuver's worth of data information is removed from the main database file. This set of data is the test file. The remaining portion of the database information file is the training file. The test and training file is converted into text files for analysis and evaluation by a subsequent advanced pattern recognition algorithm such as the Multivariate State Estimation Technique (MSET) developed by Argonne National Laboratory.

In step 5.7, the basic description of determining which vectors within the test file are in variance with normal or outside the region of vectors and thus represent new data contained in the training file is determined. This is accomplished by setting up a system model that provides analytically derived values of all monitored sensors is integrated with a statistically-based hypothesis test that compares the analytically estimated signal value with the test file measured values to detect the development or presence of new data. Three essential models of the flight for the algorithm include a training algorithm for the collection of representative data from sensors during normal system operations, an empirically based model for system state estimation, and a statistically based fault detection system.

The training model is used to produce a training set or set points whose data encompasses all expected normal operating states of the system, ideally. The system-modeling module (the test file) is used to estimate the values of all signals that are present in the process that is being monitored. The fault detection model is used to detect disturbances through an examination of the difference between the estimated and measured signal values. An algorithm (MSET for example) is used to detect incipient faults between current and normal behavior. However, instead of detecting incipient faults, the algorithm will be estimating which vectors in the test file exhibit abnormal behavior or could be considered new or useful data points when compared with the vector data stored in the training file.

In step 5.8, a test file is created. This is accomplished by using the data associated with one maneuver from the training file database. The data associated with the test file is removed in step 5.8.1 from the training file for the purpose of analyzing the maneuver. Next in step 5.8.2, the test file is deliberately seeded with certain data known to be outside the training file. Next, in step 5.8.3, a comparison of the test file to the training file is made using the advanced pattern recognition algorithm. After the comparison is made, then in step 5.8.4, the pattern recognition algorithm parameters, such as wrongful rejection probability, wrongful acceptance probability, sequential probability ratio test sensitivity, is adjusted to ensure that the algorithm is operating at optimal performance when detecting the data known to be outside the training file.

Next in step 5.9, once the algorithm parameters, the number of independent variable alarm criteria, and the non-data gathering criteria for maneuvers have been established, the test file, seeded with false data for determining optimal the algorithm parameter values, is returned back into the training master database in its original state, i.e., with the seeded data removed. At this point the algorithm is ready to begin the complete analysis of each maneuver of the simulated flight data or system test.

Step 5.10 runs the analysis of the flight tests maneuvers. In step 5.10.1, the data associated with a specific maneuver is removed from the training file and placed in a test file.

The training file is normalized or fit to a normal distribution. If the maneuver's test file is found to be a non-contributor of data, that maneuvers data is removed from the training file and the process of ranking the maneuvers in terms of data gathering capabilities starts all over again.

Next, in step 5.10.2, the test file is compared using the algorithm to the training file associated with the data of all remaining maneuvers combined to determine the variance of the maneuver from normal. Once the comparison is performed, in step 5.10.3, the data associated with the maneuver is returned to the training file and the next maneuver is removed and placed into the test file. This process is repeated until all maneuvers have had their data placed in the test file and compared to the training file comprising of data from all the other non-test file maneuvers. The resulting estimate of new information from each maneuver provides an indication of the individual maneuver's data gathering cost effectiveness. A non-contributing data-gathering maneuver contains predominantly redundant information when compared to the data from the rest of the maneuvers in the training file.

After the comparison is completed in step 5.10, a table, is prepared comprising of the flight test maneuvers and the percent of useful information contained within each maneuver. The percent of useful information is calculated by determining the number of vectors, which meet the number of independent variable alarm criteria, divided by the total number of vectors in the maneuver. The flight test engineers will then select the maneuver with the smallest percent contribution of useful information. If this value is less than the previously agreed upon value for the criteria for identifying a non-contributing data gathering maneuver, then the flight test engineer may remove the maneuver's data from the master training file.

Next, in step 5.12, a record is maintained of those maneuver vector values associated with the variable alarms for the non-contributing data gathering maneuver's data, which has been removed from the training file for future analysis. When a maneuver gathers only one significant data vector, which provides an indication that data is outside the training file range, the vector value may provide critical information and justify maintaining the maneuver in the flight test even though only one significant vector value was gathered.

After the first non-contributing data gathering maneuver has been identified and removed from the master training data file, then in step 5.13, the process of analyzing the simulated data should be repeated (from step 5.9 through 5.11). Subsequently, each time a non-contributing data-gathering maneuver is removed, the analysis of the training file against a test file for each maneuver as described above, should be repeated to ensure that all non-contributing data is accurately analyzed and identified. Finally, in step 5.14, a listing of all non-contributing data gathering maneuvers and maneuver vector values associated with variable alarms are prepared for presentation to the flight test engineers. This list will show the maneuver candidates for flight test elimination.

Figure 20:
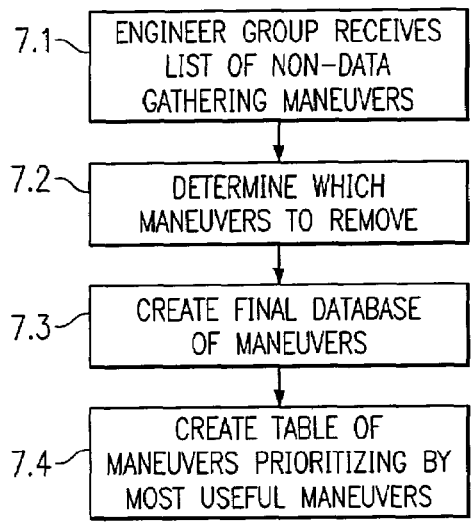
FIG. 20 illustrates step 7 of FIG. 18 in greater detail.

FIG. 20 illustrates step 7 of FIG. 18 in greater detail. In step 7.1, the flight test engineering, analysis and design groups receive a listing of non-data gathering maneuvers identified as possible candidates for removal from the flight test. The flight test engineers determine which non-data gathering maneuvers may be eliminated from the flight test in step 7.2. Criteria for elimination may include the lack of data gathered, the importance of the minimal data gathered, or flight test safety aspects if the maneuver is eliminated, as well as others.

Once the flight test engineers have made the determination as described in step 7.2, then a final training file database composed of only those maneuvers selected for the final test flight is created in step 7.3. A table listing the percent of useful information contained within each final flight test maneuver using steps 5.9 through 5.10 is prepared in step 7.4. The list of maneuvers is prioritized showing which maneuvers gather the most useful data and the data gathering cost effectiveness of each maneuver. The flight test engineers redesign the reduced size flight test to accommodate the elimination of the non-data gathering maneuvers chosen for removal. The prioritized list of maneuvers indicating each maneuver's data gathering effectiveness can also be utilized in the flight test redesign to ensure that the flight test redesign is conducted in the most efficient data gathering fashion.

Figure 21:
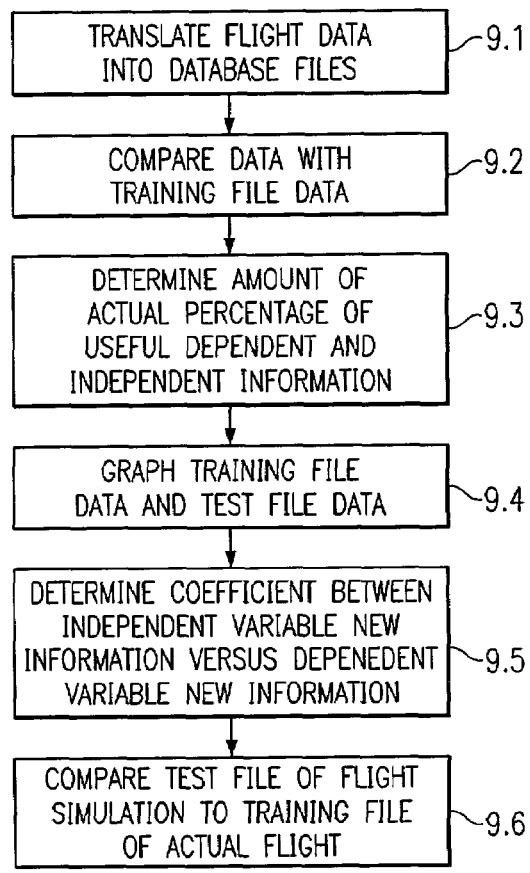
FIG. 21 illustrates step 9 of FIG. 18 in greater detail.

FIG. 21 illustrates step 9 of FIG. 18 in greater detail. In step 9.1, actual flight test data with maneuver markers and time markers is translated into various database files and test files for subsequent processing. Each subsequent maneuver with a training file composed of the previous maneuvers is compared to obtain an estimate of how much new and useful data is being gathered during the flight test in step 9.2. As the entire envelop of performance is mapped into the training file, it becomes difficult for subsequent maneuvers to add any new information and the amount of new information being added should decrease.

Upon completion of the flight test and using the parameters set up from step 5, the percentage of useful dependent and independent information in each maneuver is determined, when compared to a training file composed of data from all flight test maneuvers in step 9.3. The independent variable useful information values obtained for each maneuver in actual flight test to those obtained in flight simulation to determine the accuracy of the flight.

Next, in step 9.4, graphs of various variable combinations depicting the training file data and test file data are prepared to confirm that the test file data identified as useful is visually outside the training file region. The correlation coefficient between independent variable new information obtained versus dependent variable new information is determined to obtain enhanced future estimates. Finally, in step 9.6, the test files of flight simulation data is compared to the training file of actual flight test data using the parameters set in step 5. Those regions of the simulation that need adjustment to better represent actual aircraft performance is highlighted, and the flight simulation is enhanced by adjusting the flight simulation parameters.

The following examples illustrate the present invention's ability to detect new information in a test file when using aircraft data distributions. FIG. 4 shows a comparison of a theoretical distribution vs. a distribution of aircraft data. A training file composed of data variables (fan rotor speed vs. EPLA engine power level angle) taken from an aircraft flight is compared to a test file composed of the same two variables arranged in a diagonal line (moving randomly off center). As the test file line intersects the training file data, the portion of the data from the diagonal line test file (highlighted in pink) outside of the training file becomes apparent.

Comparisons between distributions of aircraft data demonstrate the invention's capability of determining the amount of useful in formation obtained in one distribution when compared to another. Each data point may have not two but hundreds of variables associated with it. One of the advantages in using a pattern recognition algorithm is the capability of analyzing data points associated with large numbers of variables in multi-dimensional space. For ease of illustration, comparison examples will be limited to graphs of two significant variables.

Having thus described our invention, what we claim as new and desire to secure by Letters Patent is set forth in the following claims.

What is claimed is:

1. A computer implemented method for optimizing data gathering, the method comprising the steps of:
   designing a first system test of two or more maneuvers;
   compiling a one or more data variable for each of the two or more maneuvers from the first system test;
   pooling each data variable from each maneuver into a first set of data;
   removing a first maneuver's data variables from the pooled first set of data;
   comparing the first maneuver's data variables against the first set of data with the first maneuver's data variables removed; and
   determining whether to perform the first maneuver based on whether the maneuver provided new data and storing the result.

2. The method is claim 1 further comprising the steps of:
   simulating the first system test by simulating each of the two or more maneuvers; and
   using the simulation to calculate each one or more data variable for each of the one or more maneuver.

3. The method of claim 1 further comprising the step of removing the first maneuver from the first system test if the maneuver provided no new data.

4. The method of claim 3 further comprising the steps of:
   removing a next successive maneuver's data variables from the pooled first set of data;
   comparing the next successive maneuver's data variables against the first set of data with the next successive maneuver's data variables removed; and
   determining whether to perform the next successive maneuver based on whether the next successive prearranged maneuver provided new data.

5. The method of claim 4 further comprising the step of removing the next successive maneuver from the first system test if the next successive maneuver provided no new data.

6. The method of claim 1 further comprising the steps of:
   normalizing the pooled first set of data; and
   determining a variance of a first maneuver data's from the normalized first set of data.

7. The method of claim 6 further comprising the step of establishing a predetermined set point, whereby if the variance exceeds the set point, the first maneuver variable data is considered new data.

8. The method of claim 1 wherein the first system test is a flight test.

9. The method of claim 1, wherein the comparing step further comprises the step of using the MSET algorithm.

10. The method of claim 1 wherein the comparing step further comprises the step of using a pattern recognition algorithm analysis to determine if the maneuver's variable data varies from the first set of data.

11. A computer implemented method for optimizing data gathering, the method comprising the steps of:
   performing a first system test;
   compiling a first set of test data from the first system test;
   designing a second system test;
   designing a series of one or more maneuvers for the second system test;
   performing each one or more maneuvers as part of the second system test; and
   compiling a one or more data variable from each of the one or more maneuvers,
   compiling a second set of test data from the second system test;
   comparing the first data set to the second data set;

determining whether to perform the second test based on the comparing step;

comparing a first maneuver's data variables against the first set of data; and determining whether to perform the first maneuver based on whether the maneuver provided new data and storing the result.

12. A computer implemented method for optimizing data gathering, the method comprising the steps of:

performing a first system test;

compiling a first set of test data from the first system test;

designing a second system test;

designing a series of one or more maneuvers for the second system test;

performing each one or more maneuvers as part of the second system test;

compiling a one or more data variable from each of the one or more maneuvers, compiling a second set of test data from the second system test;

comparing the first data set to the second data set;

determining whether to perform the second test based on the comparing step;

simulating the second system test by simulating each one or more maneuver; and calculating each one or more data variable for each of the one or more simulated maneuver and storing the result.

13. The method of claim 11 further comprising the steps of:

removing the first maneuver from the second system test if the maneuver provided no new data;

comparing a next successive maneuver's data variables against the first set of data; and determining whether to perform the next successive maneuver based on whether the next successive maneuver provided new data.

14. The method of claim 11, wherein the first system test is a flight test.

15. The method of claim 11, wherein the comparing step further comprises the step of using the MSET algorithm.

16. The method of claim 11, wherein the comparing step further comprises the step of using statistically analysis to determine if the second set of prearranged maneuver's variable data varies from the first set of data.

* * * * *